US012551183B2

(12) United States Patent
Fouras et al.

(10) Patent No.: US 12,551,183 B2
(45) Date of Patent: Feb. 17, 2026

(54) IMAGING DEVICE AND METHOD FOR OPTIMISING IMAGE ACQUISITION

(71) Applicant: AUSTRALIAN LUNG HEALTH INITIATIVE PTY LTD, Carlton (AU)

(72) Inventors: Andreas Fouras, Carlton (AU); Jonathan Dusting, Carlton (AU); Paul Chapman, Carlton (AU)

(73) Assignee: AUSTRALIAN LUNG HEALTH INITIATIVE PTY LTD, Carlton (AU)

( * ) Notice: Subject to any disclaimer, the term of this patent is extended or adjusted under 35 U.S.C. 154(b) by 379 days.

(21) Appl. No.: 18/003,142

(22) PCT Filed: Jun. 25, 2021

(86) PCT No.: PCT/AU2021/050668
§ 371 (c)(1),
(2) Date: Dec. 22, 2022

(87) PCT Pub. No.: WO2021/258155
PCT Pub. Date: Dec. 30, 2021

(65) Prior Publication Data
US 2023/0255583 A1  Aug. 17, 2023

Related U.S. Application Data

(60) Provisional application No. 63/044,090, filed on Jun. 25, 2020, provisional application No. 63/043,994, filed on Jun. 25, 2020.

(51) Int. Cl.
*A61B 6/00* (2024.01)
*A61B 5/055* (2006.01)
(Continued)

(52) U.S. Cl.
CPC .............. *A61B 6/541* (2013.01); *A61B 5/055* (2013.01); *A61B 6/032* (2013.01); *A61B 6/463* (2013.01);
(Continued)

(58) Field of Classification Search
CPC ..................................................... A61B 6/541
See application file for complete search history.

(56) References Cited

U.S. PATENT DOCUMENTS 8,457,717 B2   6/2013   Keall et al.
9,538,976 B2   1/2017   Keall et al.
(Continued)

FOREIGN PATENT DOCUMENTS

CN    101683268 A    3/2010
GB    2 441 550 A    3/2008
(Continued)

OTHER PUBLICATIONS

International Search Report dated Sep. 3, 2021 from corresponding International Patent Application No. PCT/AU2021/050668, 7 pages.
(Continued)

*Primary Examiner* — Joseph M Santos Rodriguez
(74) *Attorney, Agent, or Firm* — Ruggiero McAllister & McMahon LLC

(57) ABSTRACT

An imaging device for acquiring a time series of in vivo images of a region of a subject's body is provided. The imaging device includes a energy source, a detector for detecting energy from the energy source passing through the region of the subject's body located between the energy source and detector, a controller configured to operate the energy source and the detector to acquire a time series of in vivo images of the region of the subject's body, a sensor for monitoring a physiological parameter associated with the region of the subject's body to be imaged and a processor (Continued)

configured to determine timing of the image acquisition based at least on the monitored physiological parameter. A method for acquiring a time series of in vivo images of a region of a subject's body using the imaging device is also provided.

21 Claims, 12 Drawing Sheets

(51) Int. Cl.
  *A61B 6/03* (2006.01)
  *A61B 6/46* (2024.01)
  *G06T 7/00* (2017.01)
  *A61B 5/113* (2006.01)

(52) U.S. Cl.
  CPC ............ *A61B 6/486* (2013.01); *G06T 7/0012* (2013.01); *A61B 5/113* (2013.01); *G06T 2207/30061* (2013.01)

(56) References Cited

U.S. PATENT DOCUMENTS

| | | |
|---|---|---|
| 2005/0201510 A1 | 9/2005 | Mostafavi |
| 2008/0123812 A1 | 5/2008 | Sabol et al. |
| 2010/0142670 A1 | 6/2010 | Saito et al. |
| 2013/0070062 A1 | 3/2013 | Fouras et al. |
| 2014/0192952 A1 | 7/2014 | Keall et al. |
| 2015/0228071 A1 | 8/2015 | Jockel et al. |
| 2017/0143289 A1 | 5/2017 | Fouras |
| 2019/0126070 A1 | 5/2019 | Hsieh |
| 2019/0378329 A1 | 12/2019 | Kiely |

FOREIGN PATENT DOCUMENTS

| | | | |
|---|---|---|---|
| JP | 2003-245272 A | 9/2003 | |
| JP | 2009-089873 A | 4/2009 | |
| JP | 20009-153677 A | 7/2009 | |
| JP | 2010-110445 A | 5/2010 | |
| JP | 2013-039218 A | 2/2013 | |
| JP | 2014-094037 A | 5/2014 | |
| JP | 2017-511239 A | 4/2017 | |
| JP | 2019-170755 A | 10/2019 | |
| WO | 2011/032210 A1 | 3/2011 | |
| WO | 2015/157799 A1 | 10/2015 | |
| WO | 2019/121702 A1 | 6/2019 | |
| WO | 2019/236317 A1 | 12/2019 | |

OTHER PUBLICATIONS

Written Opinion dated Sep. 3, 2021 from corresponding International Patent Application No. PCT/AU2021/050668, 11 pages.
European Search Report dated Apr. 19, 2024 from corresponding European Patent Application No. 21829326.4, 11 pages.
International Preliminary Report on Patentability dated Sep. 3, 2021 from corresponding International Patent Application No. PCT/AU2021/050668, 12 pages.
Extended European Search Report dated Aug. 5, 2024 from corresponding European Patent Application No. 21829326.4, 12 pages.
Examination Report dated Sep. 16, 2025 from corresponding European Patent Application No. 21829326.4, 12 pages.

IMAGING DEVICE AND METHOD FOR OPTIMISING IMAGE ACQUISITION

CROSS REFERENCE TO RELATED APPLICATIONS

This application is a national stage entry of International Application No. PCT/AU2021/050668 filed on Jun. 25, 2021, which claims priority from U.S. Provisional Patent Application No. 63/044,090 filed on 25 Jun. 2020, and from U.S. Provisional Patent Application No. 63/043,994 filed on 25 Jun. 2020, the contents of each of which are incorporated by reference herein in its entirety.

TECHNICAL FIELD

The present disclosure relates to an imaging device and method for acquiring a time series of in vivo images of a region of a human or animal subject's body, and optimising acquisition of the images. It also relates particularly but not exclusively to dynamic in vivo imaging of an organ, such as the lungs or heart of the subject.

BACKGROUND

Lung conditions and diseases such as chronic obstructive pulmonary disease (COPD), asthma, bronchiectasis, cystic fibrosis (CF), and lung cancer have significant social and economic cost. An estimated 1 billion people are affected globally, with one death approximately every two seconds being attributed to lung diseases, and more than US$1.4 trillion is spent on lung health globally each year. In Australia, 7 million people (approximately 1 in 3) live with a lung condition and lung conditions are Australia's second leading cause of death and account for more than 10 per cent of the total health burden. Lung conditions have a marked effect on people's ability to enjoy life, and be active and productive. People living with these conditions, their families, the health care system and the broader community experience significant health and economic burden.

Current lung diagnostics are inadequate and cannot achieve accurate assessment of lung health or provide early detection or diagnosis of lung disease. Reliable detection and location of lung conditions or diseases at an early stage is critical for a successful health outcome. As almost all lung pathologies are, by definition, associated with regional changes in the flow of air throughout the lungs, it is necessary to detect these regional changes in all lung locations and throughout the respiratory cycle. The absence of accurate and detailed lung health assessments, especially for infants or young children who cannot undertake current lung tests, represents a vital healthcare gap.

Existing pulmonary function testing methods such as spirometry are based on archaic technology that only provide averaged, global measurements of expiratory volume, which can vary significantly due to factors unrelated to disease. Global measurements average out regional changes across the lung and thus lack the sensitivity to capture loss of lung function linked to disease until the related disease is significantly advanced. In addition, a crucial issue with standard pulmonary function tests is that infants and young children are often excluded entirely from early and ongoing lung health assessments as they are unable to understand or perform breathing-manoeuvre instructions.

Current imaging modalities such as X-ray, Computed Tomography (CT) imaging and Magnetic Resonance Imaging (MRI) provide methods to examine the structure and function of organs of a patient, such as the lungs, heart and brain. However, structural lung change often arises after disease establishment, eliminating the possibility of disease-prevention treatments (e.g., in early cystic fibrosis). While high-resolution CT imaging can provide excellent structural detail, it is costly and the relatively high levels of radiation exposure (a high-resolution CT is often equivalent to 70 chest X-rays) are of concern. Due to ionizing radiation dose, use of X-ray based techniques (especially CT) for detection and treatment of various diseases, including acute respiratory disease, is severely restricted for vulnerable patients, such as infants and children who are more susceptible to tissue damage due to radiation. Furthermore, the inherent measurement limitations also severely restrict evidence-based detection and treatment of acute respiratory disease across all ages of patients.

XV technology developed by 4DMedical has offered a breakthrough in clinical lung function assessment. The XV technology is disclosed in patent applications published as WO 2011/032210 A1 and WO 2015/157799 A1. The current XV technique uniquely combines X-ray imaging with proprietary flow velocimetry algorithms to measure motion in all locations of the lung in fine spatial and temporal detail, enabling regional lung function measurements throughout the respiratory cycle, at every location within the lung. This approach enables detection of even subtle functional losses well before lung structure is irreversibly affected by disease, meaning that treatment may be applied early, when it has the greatest impact and the best chance of success.

Current XV technology is used in clinical applications via a Software as a Service (SaaS) model, whereby scans of the patient's lungs are acquired using existing fluoroscopic X-ray equipment. The scans are then processed using software algorithms, via a cloud-based server, to provide functional imaging analysis of the patients' lungs over time. However, the accuracy and quality of the XV analysis is limited by the images able to be acquired using existing medical scanners, which require patients to remain still and breathe in a controlled fashion during scanning. This restricts access to many patient groups, including young children, the elderly, and patients with language, hearing or cognitive impairment, who are unable to be readily scanned due to positioning issues within the scanner and/or the inability to follow instructions for the scanning to be completed.

Accordingly, there is a need to provide a medical scanner for acquiring in vivo images of a patient's body, which reduces X-ray radiation exposure, whilst also enhancing scan quality, and providing access to a range of patients varying in age and health conditions. Reducing the burden of radiation is an important health outcome, especially in the very young, for whom the susceptibility and consequences of radiation exposure in their more rapidly dividing cells are more severe than for adults. There is also a need to provide the ability to more frequently scan patients, including infants and children, and across many patient groups, to allow for regular monitoring of regional lung function over long periods of time. Even extremely subtle changes may be detected, tracked closely over weeks, months or years, and assessed for their implication of disease, effect of treatment, and child development. The ability to obtain regular regional lung ventilation data will significantly improve pulmonary disease diagnosis and treatment.

Therefore, it would be desirable to provide an imaging device and method of imaging that acquires in vivo images of a patient's body, ideally suitable for analysis with XV technology, that reduces the use of X-rays and provides the ability to more frequently scan patients, and across many patient groups including those patients unable to be readily scanned. It would also be desirable to provide an imaging device and method of imaging which ameliorates and/or overcomes one or more problems or inconveniences of the prior art.

A reference herein to a patent document or any other matter identified as prior art, is not to be taken as an admission that the document or other matter was known or that the information it contains was part of the common general knowledge as at the priority date of any of the claims.

SUMMARY

In one aspect, the present disclosure provides an imaging device for acquiring a time series of in vivo images of a region of a subject's body. The imaging device includes at least one energy source, at least one detector for detecting energy from the at least one energy source passing through the region of the subject's body located between the energy source and detector, and a controller configured to operate the at least one energy source and the at least one detector to acquire a time series of in vivo images of the region of the subject's body. The imaging device also includes at least one sensor for monitoring a physiological parameter associated with the region of the subject's body to be imaged, and at least one processor configured to determine timing of the image acquisition based at least on the monitored physiological parameter.

In some embodiments, the at least one sensor for monitoring the physiological parameter is configured to detect a physiological parameter associated with the subject's breathing.

The processor may be further configured to analyse data from the at least one sensor for monitoring the physiological parameter to detect a breathing pattern of the subject and/or duration of the subject's breath, and monitor the detected breathing pattern and/or duration of the subject's breath to determine if a repetitive breathing pattern is detected. If a repetitive breathing pattern is detected, the processor may be further configured to analyse the repetitive breathing pattern to identify one or more characteristics of a breathing cycle of the subject, and determine a trigger signal to commence image acquisition including at least a start time and/or end time based on the one or more identified characteristics of the breathing cycle.

In some embodiments, the at least one sensor for monitoring the physiological parameter is positionable near and/or within the subject's mouth, and includes one or more of: a flowmeter for monitoring air flow changes near and/or within the subject's mouth; a thermal sensor for monitoring temperature changes of the air near and/or within the subject's mouth; and a gas sensor for monitoring gaseous changes in the air content near and/or within the subject's mouth.

The imaging device may further include at least one sensor for monitoring movement of the subject's body located between the energy source and detector. The processor may be further configured to determine timing of the image acquisition based also on the monitored movement of the subject's body.

In some embodiments, the processor is further configured to process the data from the at least one sensor for monitoring movement to detect movement of the subject's body located between the energy source and detector, monitor the detected movement to determine if the subject is in a substantially stationary position, and determine a trigger signal to commence image acquisition including at least a start time if the subject is in the substantially stationary position.

The at least one sensor for monitoring movement may include one or more of: a motion sensor, a resistive sensor, a weight sensor, a force sensor, and a pressure sensor. The motion sensor may be a camera. The motion sensor may include an accelerometer, gyroscope and/or magnetometer for measuring motion of the subject's body. The resistive sensor may include a strain gauge, for example, which may measure displacement of the subject's body.

Preferably, the movement detected and monitored is non-breathing related movement of the subject's body between the energy source and detector. Ideally, the subject's breathing is not restricted or controlled during image acquisition. The imaging device may be configured to acquire the images while the subject is breathing and preferably of a single breath of the subject.

In some embodiments, the imaging device further includes at least one sensor for detecting position and/or orientation of the subject's body located between the energy source and detector. The processor is further configured to determine timing of the image acquisition based also on the detected position and/or orientation of the subject's body.

The processor may be further configured to determine an adjustment of the position and/or orientation of the subject's body to a desired location between the energy source and detector for acquiring the images of the region of the subject's body.

In some embodiments, the processor is further configured to estimate a position of the region of the subject's body to be imaged using prior-acquired data, and determine the desired location for acquiring the images based on the estimated position. The processor may be further configured to receive the prior-acquired data which includes at least one of: one or more prior-acquired images of the region of the subject's body; one or more physical characteristics of the subject selected from a group including: anatomical dimensions of the region and/or subject's body, height, and/or weight; and one or more attributes of the subject selected from a group including: age, gender, mobility, ethnicity, disease status and/or medical history.

The imaging device may further include a support member for supporting the subject's body at a location between the energy source and detector, and an actuator operable for adjusting the position and/or orientation of the support member. The controller may be further configured to control the actuator to adjust the position and/or orientation of the support member to support the subject's body at the desired location for acquiring the images.

In some embodiments, the imaging device further includes an output device. The processor may be further configured to output instructions, using the output device, for an operator and/or the subject to adjust the subject's position and/or orientation to the desired location for acquiring the images. The processor may also be further configured to output instructions, using the output device, for the operator and/or the subject on timing of the image acquisition, where the instructions include at least a trigger signal to commence image acquisition.

The at least one sensor for detecting position and/or orientation may include one or more of: a camera, a light sensor, a motion-based sensor, and a laser sensor.

The region to be imaged may include at least part of a lung of the subject. The imaging device may image the whole lung of the subject. The imaging device may also image both lungs of the subject. Alternatively, the region to be imaged may include part of or the whole of the heart or brain of the subject.

The imaging device may be configured for use with one or more of x-ray imaging, ultrasound imaging, and magnetic resonance imaging (MRI). The x-ray imaging may include fluoroscopic imaging, computed tomographic x-ray velocity (CTXV) imaging and/or four-dimensional computed tomography (4D CT) imaging.

The imaging device may include at least three energy sources and at least three detectors for acquiring three time series of in vivo images of the region of the subject's body. The processor may be further configured to construct a three-dimensional motion field based on the three time series of images acquired. In some embodiments, the imaging device may include at least four energy sources and at least four detectors for acquiring four time series of in vivo images of the region of the subject's body.

In another aspect, the present disclosure provides a method for acquiring a time series of in vivo images of a region of a subject's body. The method includes the step of providing an imaging device including: at least one energy source; at least one detector for detecting energy from the at least one energy source passing through the region of the subject's body located between the energy source and detector; and a controller configured to operate the at least one energy source and at least one detector to acquire a time series of in vivo images of the region of the subject's body. The method also includes the steps of: monitoring, using at least one sensor, a physiological parameter associated with the region of the subject's body to be imaged; determining, using at least one processor, timing of the image acquisition based at least on the monitored physiological parameter; and operating the controller to acquire the time series of in vivo images of the region of the subject's body.

In some embodiments, the method further includes the step of detecting, using the at least one sensor for monitoring the physiological parameter, a physiological parameter associated with the subject's breathing.

The method may further include the steps of the processor: analysing data from the at least one sensor for monitoring the physiological parameter to detect a breathing pattern of the subject and/or duration of the subject's breath; and monitoring the detected breathing pattern and/or duration of the subject's breath to determine if a repetitive breathing pattern is detected. If a repetitive breathing pattern is detected, the method may further include the steps of the processor: analysing the repetitive breathing pattern to identify one or more characteristics of a breathing cycle of the subject; and determining a trigger signal to commence image acquisition including at least a start time and/or end time based on the one or more identified characteristics of the breathing cycle.

In some embodiments, the method further includes the step of: positioning the at least one sensor for monitoring the physiological parameter near and/or within the subject's mouth, and wherein the method further includes one or more of the following steps: monitoring, using a flowmeter, air flow changes near and/or within the subject's mouth; monitoring, using a thermal sensor, temperature changes of the air near and/or within the subject's mouth; and monitoring, using a gas sensor, gaseous changes in air content near and/or within the subject's mouth.

The method may further include the step of monitoring, using at least one sensor, movement of the subject's body located between the energy source and detector, and the method may further include the step of the processor: determining timing of the image acquisition based also on the monitored movement of the subject's body.

In some embodiments, the method further includes the steps of the processor: processing the data from the at least one sensor for monitoring movement to detect movement of the subject's body located between the energy source and detector; monitoring the detected movement to determine if the subject is in a substantially stationary position; and determining a trigger signal to commence image acquisition including at least a start time if the subject is in the substantially stationary position.

The at least one sensor for monitoring movement may include one or more of: a motion sensor, a resistive sensor, a weight sensor, a force sensor, and/or a pressure sensor. The motion sensor may be a camera. The motion sensor may include an accelerometer, gyroscope and/or magnetometer for measuring motion of the subject's body. The resistive sensor may include a strain gauge, for example, which may measure displacement of the subject's body.

Preferably, the movement detected and monitored is non-breathing related movement of the subject's body between the energy source and detector. Ideally, the subject's breathing is not restricted or controlled during image acquisition. The imaging device may be configured to acquire the images while the subject is breathing and preferably of a single breath of the subject.

In some embodiments, the method further includes the step of: detecting, using at least one sensor, position and/or orientation of the subject's body located between the energy source and detector, and the method further includes the step of the processor determining timing of the image acquisition based also on the detected position and/or orientation of the subject's body.

In some embodiments, the method further includes the step of the processor determining an adjustment of the position and/or orientation of the subject's body to a desired location between the energy source and detector for acquiring the images of the region of the subject's body.

In some embodiments, the method further includes the steps of the processor: estimating a position of the region of the subject's body to be imaged using prior-acquired data; and determining the desired location for acquiring the images based on the estimated position. The method may further include the step of the processor: receiving the prior-acquired data which includes at least one of: one or more prior-acquired images of the region of the subject's body; one or more physical characteristics of the subject selected from a group including: anatomical dimensions of the region and/or subject's body, height, and/or weight; and one or more attributes of the subject selected from a group including: age, gender, mobility, ethnicity, disease status and/or medical history.

In some embodiments, the imaging device further includes a support member for supporting the subject's body at a location between the energy source and detector, and an actuator operable for adjusting the position and/or orientation of the support member. The method may further include the steps of: supporting the subject's body on the support member of the imaging device; and operating the actuator to adjust the position and/or orientation of the support member to support the subject's body at the desired location for acquiring the images. In some embodiments, the method may further include the step of operating the controller to control the actuator to adjust the position and/or orientation of the support member to support the subject's body at the desired location for acquiring the images.

In some embodiments, the method further includes the step of the processor: outputting instructions, using an output device of the imaging device, for an operator and/or the subject to adjust the subject's position and/or orientation to the desired location for acquiring the images. The method may also further include the step of the processor: outputting instructions, using the output device of the imaging device, for the operator and/or the subject on timing of the image acquisition, where the instructions include at least a trigger signal to commence image acquisition.

The at least one sensor for detecting position and/or orientation may include one or more of: a light sensor, a motion-based sensor, and a laser sensor.

In some embodiments, the region to be imaged includes at least part of a lung of the subject. The method may include operating the controller to acquire images of the part of the lung or the whole lung of the subject. The method may also include operating the controller to acquire images of both lungs of the subject. Alternatively, the region to be imaged may include part of or the whole of the heart or brain of the subject.

The imaging device may be configured for use with one or more of x-ray imaging, ultrasound imaging, and magnetic resonance imaging (MRI). The x-ray imaging may include fluoroscopic imaging, computed tomographic x-ray velocity (CTXV) imaging and/or four-dimensional computed tomography (4D CT) imaging.

The imaging device may further include at least three energy sources and at least three detectors for acquiring three time series of in vivo images of the region of the subject's body. The method may further include the step of reconstructing, using the processor, a three-dimensional motion field based on the three time series of images acquired.

In another aspect, the present disclosure provides an imaging device for acquiring a time series of in vivo images of a region of a subject's body. The imaging device includes at least one energy source, at least one detector for detecting energy from the at least one energy source passing through the region of the subject's body located between the energy source and detector, and a controller configured to operate the at least one energy source and the at least one detector to acquire a time series of in vivo images of the region of the subject's body. The imaging device also includes at least one sensor for detecting position and/or orientation of the subject's body located between the energy source and detector, and at least one processor configured to determine timing of the image acquisition based at least on the detected position and/or orientation of the subject's body.

In some embodiments, the processor is further configured to determine an adjustment of the position and/or orientation of the subject's body to a desired location between the energy source and detector for acquiring the images of the region of the subject's body.

In some embodiments, the processor is further configured to estimate a position of the region of the subject's body to be imaged using prior-acquired data, and determine the desired location for acquiring the images based on the estimated position. The processor may be further configured to receive the prior-acquired data which includes at least one of: one or more prior-acquired images of the region of the subject's body; one or more physical characteristics of the subject selected from a group including: anatomical dimensions of the region and/or subject's body, height, and/or weight; and one or more attributes of the subject selected from a group including: age, gender, mobility, ethnicity, disease status and/or medical history.

The imaging device may further include a support member for supporting the subject's body at a location between the energy source and detector, and an actuator operable for adjusting the position and/or orientation of the support member. The controller may be further configured to control the actuator to adjust the position and/or orientation of the support member to support the subject's body at the desired location for acquiring the images.

In some embodiments, the imaging device further includes an output device. The processor may be further configured to output instructions, using the output device, for an operator and/or the subject to adjust the subject's position and/or orientation to the desired location for acquiring the images. The processor may also be further configured to output instructions, using the output device, for the operator and/or the subject on timing of the image acquisition, where the instructions include at least a trigger signal to commence image acquisition.

The at least one sensor for detecting position and/or orientation may include one or more of: a camera, a light sensor, a motion-based sensor, and a laser sensor.

The imaging device may further include at least one sensor for monitoring movement of the subject's body located between the energy source and detector. The processor may be further configured to determine timing of the image acquisition based also on the monitored movement of the subject's body.

The processor may be further configured to: process the data from the at least one sensor for monitoring movement to detect movement of the subject's body located between the energy source and detector; monitor the detected movement to determine if the subject is in a substantially stationary position; and determine a trigger signal to commence image acquisition including at least a start time if the subject is in the substantially stationary position.

The at least one sensor for monitoring movement may include one or more of: a motion sensor, a resistive sensor, a weight sensor, a force sensor, and a pressure sensor. The motion sensor may be a camera. The motion sensor may include an accelerometer, gyroscope and/or magnetometer for measuring motion of the subject's body. The resistive sensor may include a strain gauge, for example, which may measure displacement of the subject's body.

Preferably, the movement detected and monitored is non-breathing related movement of the subject's body between the energy source and detector. Ideally, the subject's breathing is not restricted or controlled during image acquisition. The imaging device may be configured to acquire the images while the subject is breathing and preferably of a single breath of the subject.

In some embodiments, the imaging device further includes at least one sensor for monitoring a physiological parameter associated with the region of the subject's body to be imaged. The processor may be further configured to determine timing of the image acquisition based also on the monitored physiological parameter.

The at least one sensor for monitoring the physiological parameter may be configured to detect a physiological parameter associated with the subject's breathing.

The processor may be further configured to analyse data from the at least one sensor for monitoring the physiological parameter to detect a breathing pattern of the subject and/or duration of the subject's breath, and monitor the detected breathing pattern and/or duration of the subject's breath to determine if a repetitive breathing pattern is detected. If a repetitive breathing pattern is detected, the processor is further configured to: analyse the repetitive breathing pattern to identify one or more characteristics of a breathing cycle of the subject; and determine a trigger signal to commence image acquisition including at least a start time and/or end time based on the one or more identified characteristics of the breathing cycle.

In some embodiments, the at least one sensor for monitoring the physiological parameter is positionable near and/or within the subject's mouth, and includes one or more of: a flowmeter for monitoring air flow changes near and/or within the subject's mouth; a thermal sensor for monitoring temperature changes of the air near and/or within the subject's mouth; and a gas sensor for monitoring gaseous changes in the air content near and/or within the subject's mouth.

The region to be imaged may include at least part of a lung of the subject. The imaging device may image the whole lung of the subject. The imaging device may also image both lungs of the subject. Alternatively, the region to be imaged may include part of or the whole of the heart or brain of the subject.

The imaging device may be configured for one or more of x-ray imaging, ultrasound imaging, and magnetic resonance imaging (MRI). The x-ray imaging may include fluoroscopic imaging, computed tomographic x-ray velocity (CTXV) imaging and/or four-dimensional computed tomography (4D CT) imaging.

The imaging device may include at least three energy sources and at least three detectors for acquiring three time series of in vivo images of the region of the subject's body. The processor may be further configured to construct a three-dimensional motion field based on the three time series of images acquired. In some embodiments, the imaging device may include at least four energy sources and at least four detectors for acquiring four time series of in vivo images of the region of the subject's body.

In another aspect, the present disclosure provides a method for acquiring a time series of in vivo images of a region of a subject's body. The method includes the step of providing an imaging device including: at least one energy source; at least one detector for detecting energy from the at least one energy source passing through the region of the subject's body located between the energy source and detector; and a controller configured to operate the at least one energy source and the at least one detector to acquire a time series of in vivo images of the region of the subject's body. The method also includes the steps of: detecting, using at least one sensor, position and/or orientation of the subject's body located between the energy source and detector; determining, using at least one processor, timing of the image acquisition based at least on the detected position and/or orientation of the subject's body; and operating the controller to acquire the time series of in vivo images of the region of the subject's body.

In some embodiments, the method further includes the step of the processor: determining an adjustment of the position and/or orientation of the subject's body to a desired location between the energy source and detector for acquiring the images of the region of the subject's body.

In some embodiments, the method further includes the steps of the processor: estimating a position of the region of the subject's body to be imaged using prior-acquired data; and determining the desired location for acquiring the images based on the estimated position. The method may further include the step of the processor: receiving the prior-acquired data which includes at least one of: one or more prior-acquired images of the region of the subject's body; one or more physical characteristics of the subject selected from a group including: anatomical dimensions of the region and/or subject's body, height, and/or weight; and one or more attributes of the subject selected from a group including: age, gender, mobility, ethnicity, disease status and/or medical history.

In some embodiments, the imaging device further includes a support member for supporting the subject's body at a location between the energy source and detector, and an actuator operable for adjusting the position and/or orientation of the support member. The method may further include the steps of: supporting the subject's body on the support member of the imaging device; and operating the actuator to adjust the position and/or orientation of the support member to support the subject's body at the desired location for acquiring the images. In some embodiments, the method may further include the step of operating the controller to control the actuator to adjust the position and/or orientation of the support member to support the subject's body at the desired location for acquiring the images.

In some embodiments, the method further includes the step of the processor: outputting instructions, using an output device of the imaging device, for an operator and/or the subject to adjust the subject's position and/or orientation to the desired location for acquiring the images. The method may also further include the step of the processor: outputting instructions, using the output device of the imaging device, for the operator and/or the subject on timing of the image acquisition, where the instructions include at least a trigger signal to commence image acquisition.

The at least one sensor for detecting position and/or orientation may include one or more of: a camera, a light sensor, a motion-based sensor, and a laser sensor.

The method may further include the steps of monitoring, using at least one sensor, movement of the subject's body located between the energy source and detector, and further including the step of the processor determining timing of the image acquisition based also on the monitored movement of the subject's body.

In some embodiments, the method further includes the steps of the processor: processing the data from the at least one sensor for monitoring movement to detect movement of the subject's body located between the energy source and detector; monitoring the detected movement to determine if the subject is in a substantially stationary position; and determining a trigger signal to commence image acquisition including at least a start time if the subject is in the substantially stationary position.

The at least one sensor for monitoring movement includes one or more of: a motion sensor, a resistive sensor, a weight sensor, a force sensor, and a pressure sensor. The motion sensor may include a camera. The motion sensor may include an accelerometer, gyroscope and/or magnetometer for measuring motion of the subject's body. The resistive sensor may include a strain gauge, for example, which may measure displacement of the subject's body.

Preferably, the movement detected and monitored is non-breathing related movement of the subject's body between the energy source and detector. Ideally, the subject's breathing is not restricted or controlled during image acquisition. The imaging device may be configured to acquire the images while the subject is breathing and preferably of a single breath of the subject.

In some embodiments, the method further includes the steps of monitoring, using at least one sensor, a physiological parameter associated with the region of the subject's body to be imaged, and determining, using the at least one processor, timing of the image acquisition also based on the monitored physiological parameter.

The method may further include the step of detecting, using the at least one sensor for monitoring the physiological parameter, a physiological parameter associated with the subject's breathing. The method may further include the steps of the processor: analysing data from the at least one sensor for monitoring the physiological parameter to detect a breathing pattern of the subject and/or duration of the subject's breath, and monitoring the detected breathing pattern and/or duration of the subject's breath to determine if a repetitive breathing pattern is detected. If a repetitive breathing pattern is detected, the method may further include the steps of the processor: analysing the repetitive breathing pattern to identify one or more characteristics of a breathing cycle of the subject; and determining a trigger signal to commence image acquisition including at least a start time and/or end time based on the one or more identified characteristics of the breathing cycle.

The method may further include the step of positioning the at least one sensor for monitoring the physiological parameter near and/or within the subject's mouth. In some embodiments, the method further includes one or more of the following steps: monitoring, using a flowmeter, air flow changes near and/or within the subject's mouth; monitoring, using a thermal sensor, temperature changes of the air near and/or within the subject's mouth; and monitoring, using a gas sensor, gaseous changes in air content near and/or within the subject's mouth.

In some embodiments, the region to be imaged includes at least part of a lung of the subject. The method may include operating the controller to acquire images of the part of the lung or the whole lung of the subject. The method may also include operating the controller to acquire images of both lungs of the subject. Alternatively, the region to be imaged may include part of or the whole of the heart or brain of the subject.

The imaging device may be configured for use with one or more of x-ray imaging, ultrasound imaging, and magnetic resonance imaging (MRI). The x-ray imaging may include fluoroscopic imaging, computed tomographic x-ray velocity (CTXV) imaging and/or four-dimensional computed tomography (4D CT) imaging.

The imaging device may further include at least three energy sources and at least three detectors for acquiring three time series of in vivo images of the region of the subject's body. The method may further include the step of reconstructing, using the processor, a three-dimensional motion field based on the three time series of images acquired.

Also disclosed herein is an imaging device for acquiring a time series of images of a region of a subject's body. The imaging device includes at least one energy source, at least one detector for detecting energy from the at least one energy source passing through the region of the subject's body located between the energy source and detector, and a controller configured to operate the at least one energy source and the at least one detector to acquire a time series of images of the region of the subject's body. The imaging device also includes at least one sensor for monitoring a physiological parameter associated with the region of the subject's body to be imaged, and at least one processor configured to determine timing of the image acquisition based at least on the monitored physiological parameter. The imaging device may provide in vivo imaging of the region of the subject's body, and provide a time series of in vivo images. The region to be imaged may include at least part of the lungs of the subject.

Also disclosed herein is a method for acquiring a time series of images of a region of a subject's body. The method includes the step of providing an imaging device including: at least one energy source; at least one detector for detecting energy from the at least one energy source passing through the region of the subject's body located between the energy source and detector; and a controller configured to operate the at least one energy source and at least one detector to acquire a time series of images of the region of the subject's body. The method also includes the steps of: monitoring, using at least one sensor, a physiological parameter associated with the region of the subject's body to be imaged; determining, using at least one processor, timing of the image acquisition based at least on the monitored physiological parameter; and operating the controller to acquire the time series of images of the region of the subject's body. The method may provide in vivo imaging of the region of the subject's body, and acquire a time series of in vivo images. The region to be imaged may include at least part of the lungs of the subject.

Also disclosed herein is an imaging device for acquiring a time series of images of a region of a subject's body. The imaging device includes at least one energy source, at least one detector for detecting energy from the at least one energy source passing through the region of the subject's body located between the energy source and detector, and a controller configured to operate the at least one energy source and the at least one detector to acquire a time series of images of the region of the subject's body. The imaging device also includes at least one sensor for detecting position and/or orientation of the subject's body located between the energy source and detector, and at least one processor configured to determine timing of the image acquisition based at least on the detected position and/or orientation of the subject's body. The imaging device may provide in vivo imaging of the region of the subject's body, and provide a time series of in vivo images. The region to be imaged may include at least part of the lungs of the subject.

Also disclosed herein is a method for acquiring a time series of images of a region of a subject's body. The method includes the step of providing an imaging device including: at least one energy source; at least one detector for detecting energy from the at least one energy source passing through the region of the subject's body located between the energy source and detector; and a controller configured to operate the at least one energy source and the at least one detector to acquire a time series of images of the region of the subject's body. The method also includes the steps of: detecting, using at least one sensor, position and/or orientation of the subject's body located between the energy source and detector; determining, using at least one processor, timing of the image acquisition based at least on the detected position and/or orientation of the subject's body; and operating the controller to acquire the time series of images of the region of the subject's body. The method may provide in vivo imaging of the region of the subject's body, and acquire a time series of in vivo images. The region to be imaged may include at least part of the lungs of the subject.

BRIEF DESCRIPTION OF DRAWINGS

The disclosure will now be described in greater detail with reference to the accompanying drawings in which like features are represented by like numerals. It is to be understood that the embodiments shown are examples only and are not to be taken as limiting the scope of the disclosure as defined in the claims appended hereto.

DETAILED DESCRIPTION

Embodiments of the disclosure are discussed herein by reference to the drawings which are not to scale and are intended merely to assist with explanation of the disclosure. Reference herein to a subject may include a human or animal subject, or a human or animal patient on which medical procedures are performed and/or screening, monitoring and/ or diagnosis of a disease or disorder is performed. In relation to animal patients, embodiments of the disclosure may also be suitable for veterinary applications. The terms subject and patient, and imaging device and scanner, respectively, are used interchangeably throughout the description and should be understood to represent the same feature of embodiments of the disclosure. Reference herein is also provided to anatomical planes of a subject's body, including the transverse or horizontal plane, the sagittal or vertical plane, and the coronal or frontal plane through the subject's body.

Embodiments of the disclosure are directed to an imaging device and method for acquiring in vivo images of a region of a subject's body, and for optimising acquisition of those images, ideally reducing the use of X-rays in the scanning process. Preferably, the region to be imaged includes at least part of a lung of the subject, and may include the whole of a lung or both lungs of the subject. Alternatively, the region to be imaged may include part of or the whole of the heart or brain of the subject. Other organs or regions of the subject's body may also be suitable for functional imaging, such as those in which dynamic in vivo changes are detectable including changes in motion, location and/or size, during breathing or other physiological processes of the subject's body, as would be appreciated by a person skilled in the art.

The images acquired are ideally of the type suitable for XV processing in accordance with the techniques described in International Patent Application No. PCT/AU2010/ 001199 filed on 16 Sep. 2010 and published as WO 2011/ 032210 A1 on 24 Mar. 2011 filed in the name of Monash University, and International Patent Application No. PCT/ AU2015/000219 filed on 14 Apr. 2015 and published as WO 2015/157799 A1 on 22 Oct. 2015 filed in the name of 4Dx Pty Ltd, the entire disclosures of both of which are incorporated herein by this reference. Thus, the images acquired may be processed using the XV technique described in those disclosures to provide a three-dimensional motion field of the region imaged, which preferably represents the three spatial dimensions over time of the region imaged. In the context of imaging of the lungs, this allows for motion of the lungs to be measured throughout the respiratory cycle, enabling evaluation of lung function at each region within the lung in fine spatial and temporal detail. Similar images may be obtained for other regions of the subject's body, including the heart or brain, or other organs or regions in which dynamic in vivo changes are detectable.

Figure 1:
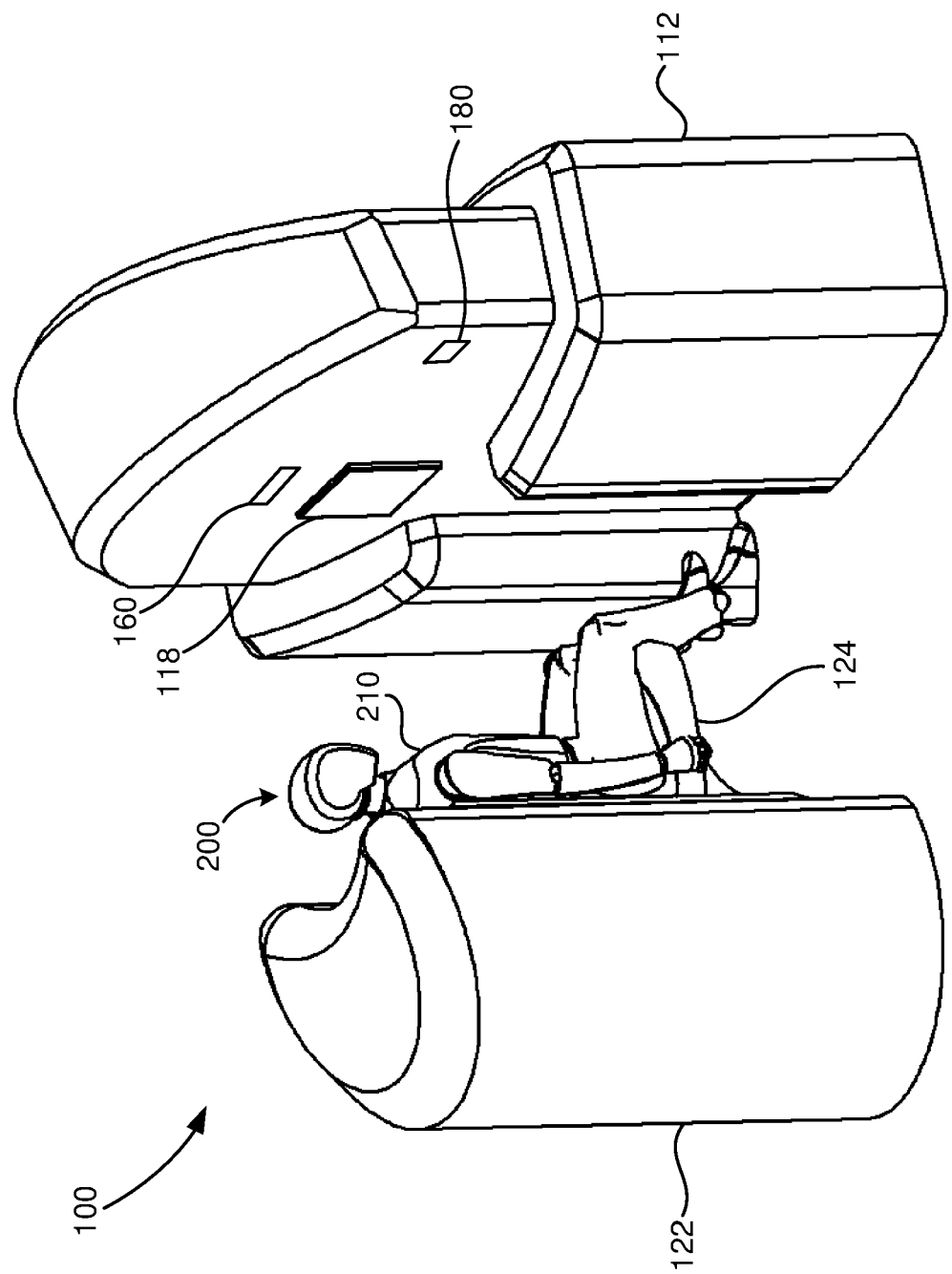
FIG. 1 is a perspective view of an imaging device viewed towards a source unit showing a subject seated for scanning, according to some embodiments of the disclosure.
Figure 2:
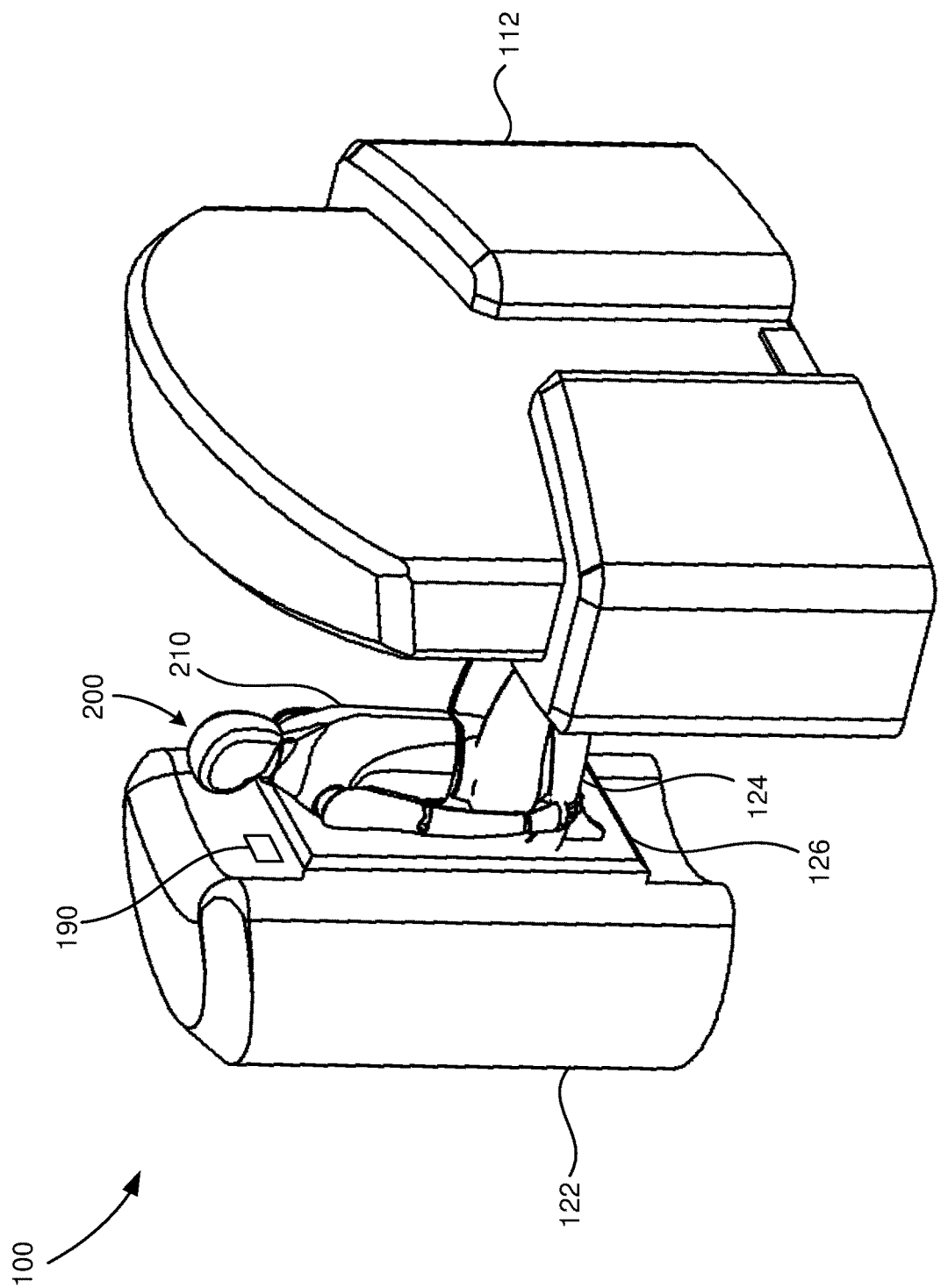
FIG. 2 is a perspective view of the imaging device of FIG. 1 viewed towards a detector unit showing a subject seated for scanning, according to some embodiments of the disclosure.
Figure 3:
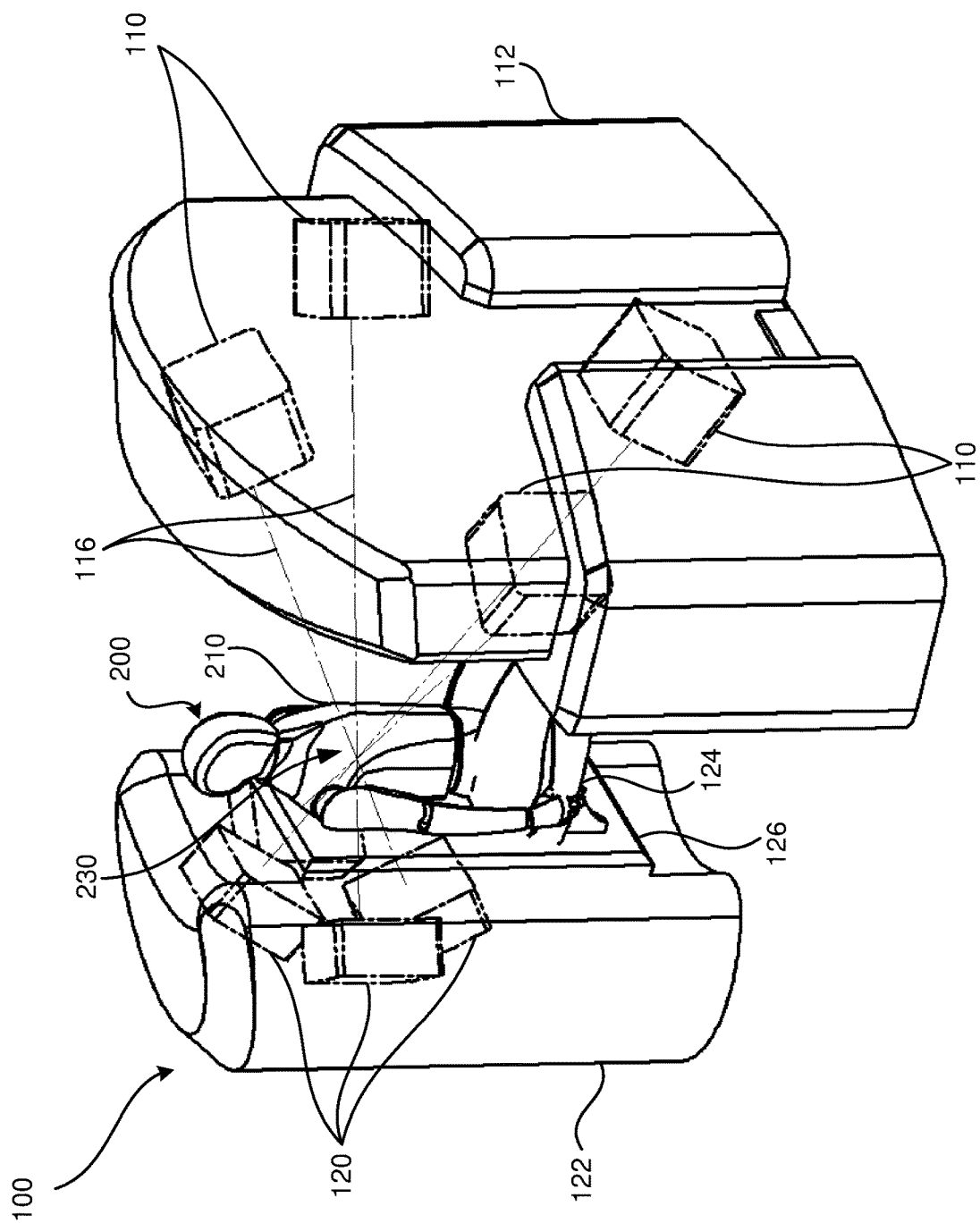
FIG. 3 is a perspective view of the imaging device of FIG. 2 showing internal positioning of detectors and sources for imaging a region of the subject's body, according to some embodiments of the disclosure.

FIGS. 1 to 3 show perspective views of an imaging device 100 showing a subject 200 seated for scanning, according to some embodiments of the disclosure. The imaging device 100 is configured for acquiring a time series of in vivo images of a region 230 of the subject's body 210 (see FIG. 3). The imaging device 100 includes at least one energy source 110, and at least one detector 120 for detecting energy from the at least one energy source 110 passing through the region 230 of the subject's body 210 located between the energy source 110 and detector 120 (see FIG. 3). The imaging device 100 also includes a controller 140 (see FIG. 7) configured to operate the at least one energy source 110 and at least one detector 120 to acquire a time series of in vivo images of the region 230 of the subject's body 210. The imaging device 100 also includes at least one processor 150 (see FIG. 7) configured to determine timing of the image acquisition.

According to a first inventive aspect, the imaging device 100 includes at least one sensor for monitoring a physiological parameter associated with the region 230 of the subject's body 210 to be imaged. The imaging device 100 also includes at least one processor 150 configured to determine timing of the image acquisition based at least on the monitored physiological parameter. Timing of the image acquisition may be solely based on the monitored physiological parameter. The features pertaining to this first inventive aspect and the advantages thereof will be described further herein.

According to a second inventive aspect, the imaging device 100 includes at least one sensor for detecting position and/or orientation of the subject's body 210 located between the energy source(s) 110 and detector(s) 120. The imaging device 100 also includes at least one processor 150 configured to determine timing of the image acquisition based at least on the detected position and/or orientation of the subject's body 210. Timing of the image acquisition may be solely based on the detected position and/or orientation of the subject's body. The features pertaining to this second inventive aspect and the advantages thereof will be described further herein.

Notably, in some preferred embodiments, the first and second inventive aspects may be combined such that the imaging device 100 includes at least one sensor for monitoring a physiological parameter associated with the region 230 of the subject's body 210 to be imaged and at least one sensor for detecting position and/or orientation of the subject's body 210. Alternatively, the imaging device 100 may include one sensor which both monitors the physiological parameter and detects position and/or orientation of the subject's body 210. Accordingly, timing of the image acquisition, as determined by the processor 150, may be based on both the monitored physiological parameter and the detected position and/or orientation of the subject's body 210. Additionally/alternatively, the first and second inventive aspects may be separately combined with one or more other aspects for optimising timing of the image acquisition. As will be described herein, the imaging device 100 may also include at least one sensor for monitoring movement of the subject's body 210, and determining timing of the image acquisition based on detected movement of the subject's body 210. Thus, timing of the image acquisition may be based on either the monitored physiological parameter or the detected position and/or orientation of the subject's body 210, in addition to detected movement of the subject's body 210. In some alternative embodiments, a single sensor may be used to monitor one or more of the physiological parameter, the position and/or orientation of the subject's body 210 and movement of the subject's body 210. Optimisation of timing of the image acquisition will be discussed throughout this description.

Returning to FIGS. 1 to 3, the imaging device 100 may include a detector unit 122 inside which is positioned one or more detectors 120, and a source unit 112 inside which is positioned one or more energy sources 110. This is more clearly shown in FIG. 3, which provides a perspective view of the imaging device 100 showing the internal position of the energy sources 110 and detectors 120, together with the energy in the form of imaging beams 116 generated by the energy sources 110 with projections that are acquired by the detectors 120 through the region 230 of the subject's body 210 to be imaged, according to some embodiments of the disclosure.

The imaging device 100 may be suitable for X-ray imaging techniques, together with other imaging methods that do not involve the use of X-rays. In particular, the imaging device 100 and method 300 may be configured for one or more of x-ray imaging, ultrasound imaging, and magnetic resonance imaging (MRI). The imaging device 100 and related method 300 may be configured for use with static or dynamic x-ray imaging techniques. Dynamic x-ray imaging techniques may include fluoroscopic imaging, computed tomographic x-ray velocity (CTXV) imaging and/or four-dimensional computed tomography (4D CT) imaging. The imaging device 100 and method 300 are preferably configured fluoroscopic imaging. The CTXV imaging technique which uses fluoroscopy is described in more detail in previously mentioned International Patent Publication Nos. WO 2011/032210 A1 and WO 2015/157799 A1.

The imaging device 100 includes at least one energy source 110 and at least one detector 120. However, preferably the imaging device 100 includes at least three detectors 120 and at least three energy sources 110 such that the controller 140 is configured to operate the detectors 120 and energy sources 110 to acquire three time series of in vivo images of the region 230 of the subject's body 210. In order to provide images suitable for XV processing, it is desirable to provide as an input at least three time series of images. The processor 150 may then be configured to reconstruct a three-dimensional motion field based on the three time series of images acquired. This information may then be processed by the processor 150 to produce three-dimensional (i.e., three spatial dimensions) motion measurements (e.g., displacement or velocity measurements) over the time of the region 230 that was imaged (which would result in four-dimensional measurements, i.e., three spatial dimensions plus time). In addition, the three-dimensional motion measurements may have either one component of velocity (3D1C), two components of velocity (3D2C), or preferably three components of velocity (3D3C). The processor 150 may employ the XV processing techniques described and incorporated herein by reference in previously mentioned International Patent Publication Nos. WO 2011/032210 A1 and WO 2015/157799 A1. As shown in FIG. 3, the imaging device 100 may include four energy sources 110 and four detectors 120. Advantageously, the use of four detectors 120 and four energy sources 110 as shown in FIG. 3 may provide greater accuracy in generating the three-dimensional motion field representing the three spatial dimensions over time of the region 230 to be imaged.

Figure 4:
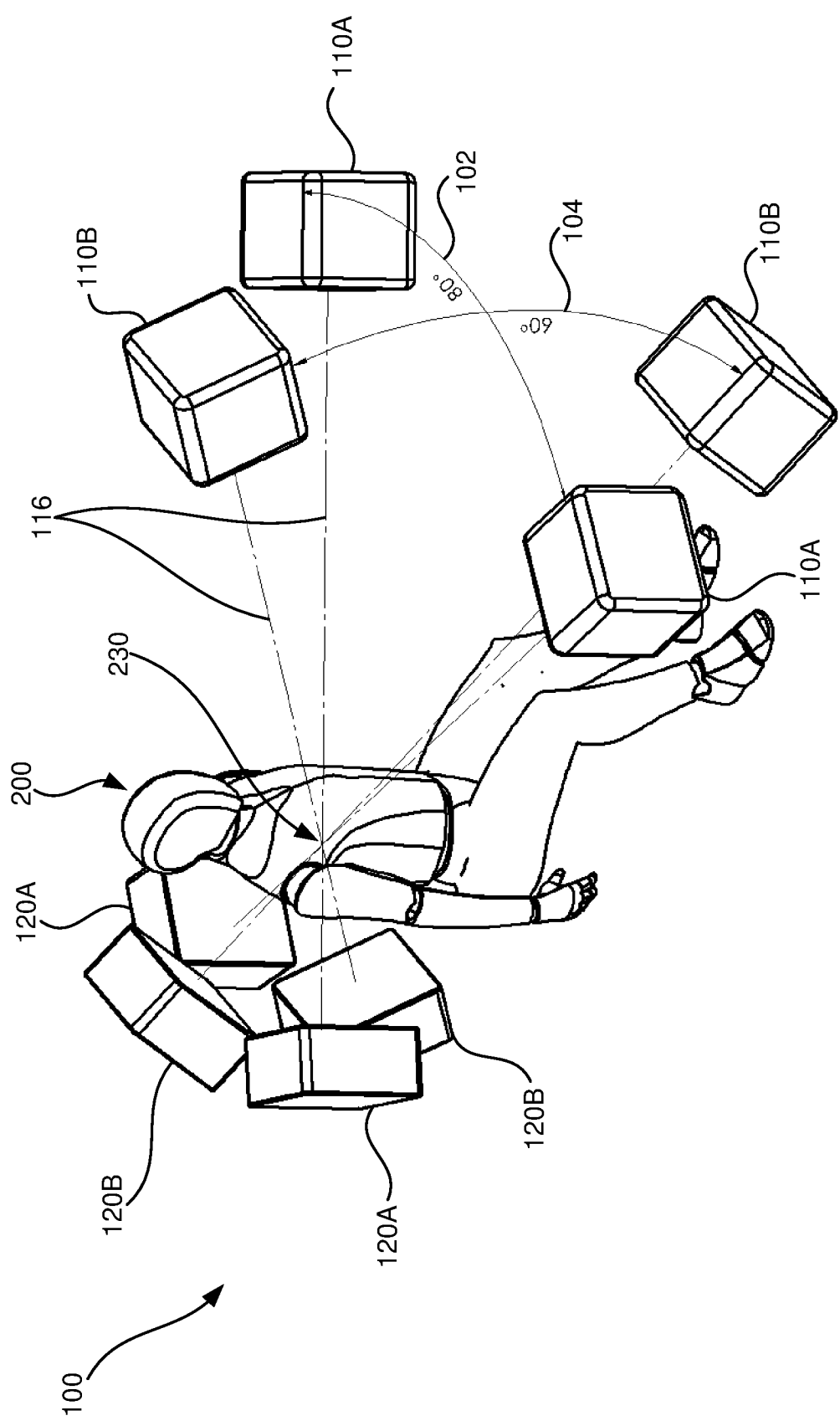
FIG. 4 is a perspective view of the imaging device of FIG. 3 excluding the exemplary detector unit and source unit for clarity.
Figure 5:
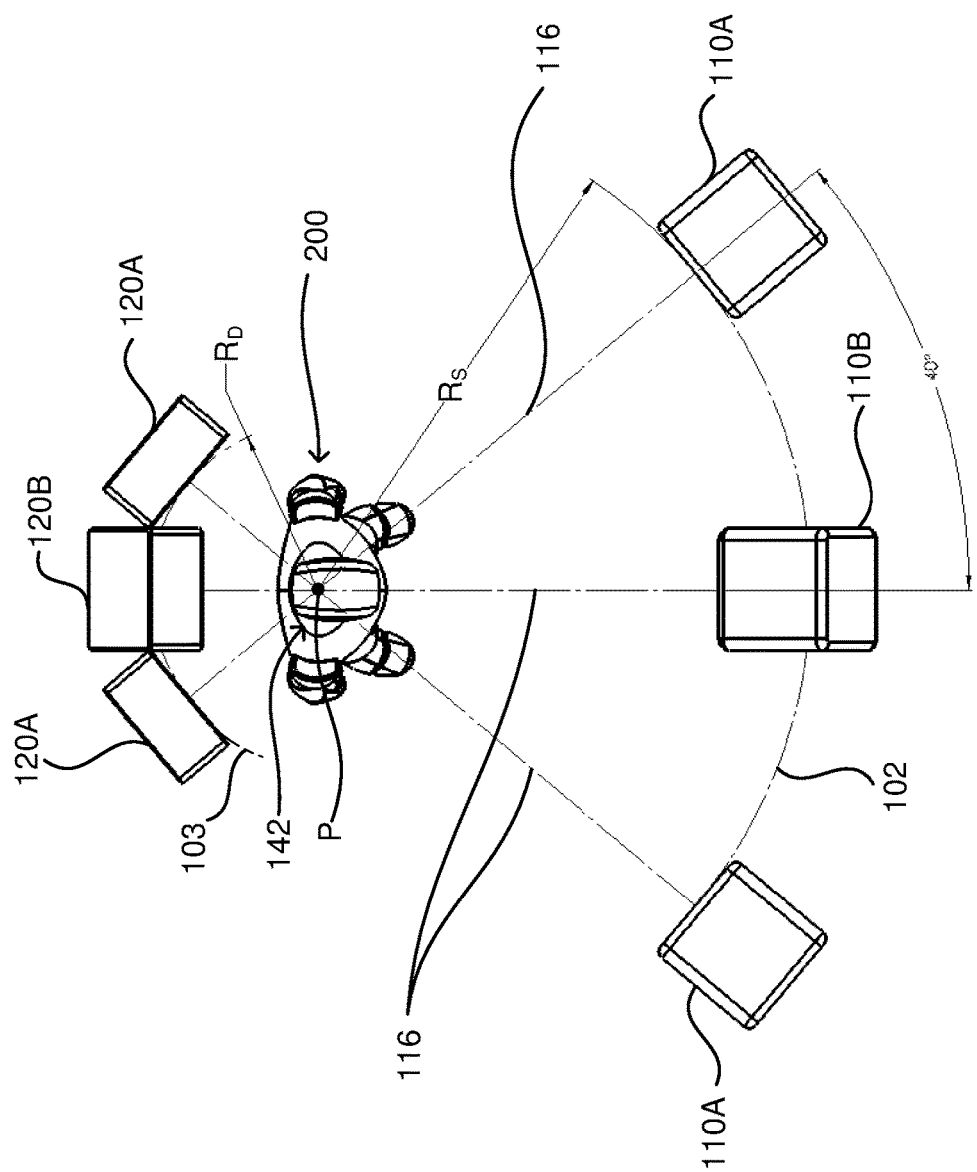
FIG. 5 is a plan view of the imaging device of FIG. 3 excluding the exemplary detector unit and source unit for clarity.

The imaging device 100 is configured to acquire a time series of in vivo images of the region 230 of the subject's body 210. Desirably, the inventive device 100 may allow the patient 200 to be breathing normally in a relaxed state while the imaging process is completed. This is in contrast to existing imaging techniques which require the patient to understand or perform breathing-manoeuvre instructions, which is particularly difficult for younger children, elderly patients or patients with language, hearing or cognitive impairment, for example. By providing multiple sources 110 and detectors 120, ideally at least three pairs of detectors/sources and in some embodiments four pairs of detectors/sources as shown in FIGS. 3 to 5, a time series of images of the subject 200 can be acquired simultaneously or at substantially the same time at a number of angles through the patient's body 210. The timing may be restricted to a specific duration based on a physiological process occurring in the subject's body 210. The region 230 to be imaged may include at least part of a lung of the subject 200, and the duration of imaging may be based on a subject's single breath. Desirably, the imaging device 100 enables multiple time series of images to be acquired of either part or a single breath of the subject 200. This may include inspiration, expiration or both inspiration and expiration for a full breath. Preferably, the imaging device 100 enables multiple time series to be acquired of a full single breath of the subject 200.

By taking images simultaneously or at substantially the same time and of a single breath, the inventive device 100 reduces the radiation dosage and scanning duration as fewer separate images need to be taken and all images are acquired typically within one breath, taking around four seconds. In comparison, legacy hardware such as fluoroscopes requires repositioning of the system for each image, and scanning four separate breaths, resulting in a scan that takes a considerable amount of time and contains inaccuracies due to measurements being acquired over four different breaths. Acquiring a full single breath simultaneously or at substantially the same time, rather than four separate breaths, advantageously allows for use of the imaging device 100 by younger patients, such as children older than three years, and also elderly patients, by reducing the radiation dosage, shortening the scanning time, and removing the requirement for the patient 200 to maintain consistent breathing across multiple breaths.

In the embodiment of FIG. 3, the imaging device 100 includes four energy sources 110 positioned in an exemplary source unit 112 and four detectors 120 positioned in an exemplary detector unit 122. The four energy sources 110 and four detectors 120 are each spatially positioned around the subject's body 210 in an approximately diamond-shaped configuration. The subject's body 210 is oriented in an upright seated position in the scanner 100. The energy sources 110 and detectors 120 remain stationary during scanning, adopting a fixed position in the imaging device 100. Although the embodiments of FIGS. 3 to 5 illustrate the use of four energy sources 110 and four detectors 120, embodiments of the disclosure may only include a single energy source 110 and detector 120. Furthermore, other embodiments may include two energy sources 110 and two detectors 120, or preferably, three energy sources 110 and three detectors 120 in order to enable sufficient imaging angles to be acquired for imaging of a dynamic event.

FIG. 4 is a perspective view of the imaging device of FIG. 3 excluding the exemplary detector unit and source unit for clarity. The imaging device 100 includes four energy sources 110 (denoted as 110A, 110B) and four detectors 120 (denoted as 120A, 120B) for detecting energy from the four energy sources 110 passing through the region 230 of the subject's body 210 located between the energy sources 110 and detectors 120. Two pairs of energy sources and detectors 110A, 120A are spatially positioned around the subject's body 210 in a first plane, which is a transverse or horizontal plane through the subject's body 210. Two pairs of energy sources and detectors 110B, 120B are spatially positioned around the subject's body 210 in a second plane, which is a sagittal or vertical plane through the subject's body 210. The first plane and the second plane intersect through the region 230 of the subject's body 210 to be imaged.

FIG. 4 shows that the energy sources 110A may be circumferentially spaced about 40 degrees to the left or right of the intersection of the first arc 102 with the second arc 104. Furthermore, the energy sources 110B may be circumferentially spaced about 30 degrees above or below of the intersection of the second arc 104 with the first arc 102. Similar circumferential spacing may be provided with respect to the detectors 120A, 120B on their respective common arcs in the first and second planes (see e.g., common arc 103 for detectors 120A in FIG. 5).

Although FIG. 4 depicts angles of about 60 and 80 degrees between the imaging angles or perspectives provided by the pairs of energy sources and detectors, embodiments of the disclosure are not limited to these angles, or to providing circumferential spacing on an arc in the planes. The imaging angles may be spaced further apart up to 180 degrees circumferentially around the subject's body 210. However, it is preferable that the energy sources 110A, 110B are closely positioned in order to provide a more compact scanner 100. Furthermore, the configuration of the energy sources 110A, 110B is also reflected in the corresponding arrangement of the detectors 120A, 120B as shown by the imaging beams 116 through the region 230. Thus, the detectors 120A, 120B are ideally closely positioned in order to provide a more compact scanner 100.

In some embodiments, the imaging angles provided by the pairs of energy sources and detectors 110A, 120A in the first plane may be spaced apart in a range of about 45 to 90 degrees, being preferably around 80 degrees apart in the diamond-shaped configuration as shown in FIG. 4. Although not shown, various other configurations of the energy sources and detectors may be provided such as a rectangular-shaped configuration, or an oval or elliptical-shaped configuration where additional energy sources and detectors are provided. Furthermore, irregular-shaped configurations may be provided.

In the diamond-shaped configuration of FIG. 4, the two imaging angles provided by the pairs of energy sources and detectors 110A, 120A may be spaced apart in the first plane in a range of about 45 to 70 degrees or about 70 to 90 degrees, or about 45 to 60 degrees, about 60 to 70 degrees, about 70 to 80 degrees or about 80 to 90 degrees. The spacing may be about 45 degrees, about 50 degrees, about 55 degrees, about 60 degrees, about 65 degrees, about 70 degrees, about 75 degrees, about 80 degrees, about 85 degrees or about 90 degrees. However, preferably the spacing is about 80 degrees as shown in FIG. 4 for the diamond-shaped configuration.

Furthermore, the two imaging angles provided by the pairs of energy sources and detectors 110B, 120B may be spaced apart in the second plane in a range of about 45 to 70 degrees. Preferably, the spacing is in a range of about 45 to 60 degrees or about 60 to 70 degrees. The spacing may be about 45 degrees, about 50 degrees, about 55 degrees, about 60 degrees, about 65 degrees or about 70 degrees. Preferably, the spacing is about 60 degrees as shown in FIG. 4 for the diamond-shaped configuration.

In some embodiments, the controller 140 is configured to acquire the images using at least four imaging angles through the region 230 of the subject's body 210. At least two imaging angles may be provided in the first plane through the subject's body 210, and at least two imaging angles may be provided in the second plane through the subject's body 210. The spatial arrangement and positioning of the pairs of energy sources and detectors provide the four imaging angles through the region 230 of the subject's body 210 which are illustrated by the imaging beams 116 generated by the energy sources 110A, 110B shown in FIGS. 3 to 5.

Embodiments of the disclosure advantageously acquire a time series of in vivo images of the region 230 of the subject's body 210. The embodiments of the disclosure include at least one pair of energy sources 110 and detectors 120 or preferably, three pairs of energy sources 110 and detectors 120, or four pairs of energy sources 110 and detectors 120 (see FIGS. 3 to 5). In the embodiments of FIGS. 3 to 5, the controller 140 is configured to operate the four energy sources 110A, 110B and the four detectors 120A, 120B to acquire a time series of in vivo images of the region 230 of the subject's body 210. This enables at least four time series of in vivo images to be acquired during scanning. By acquiring a time series of images from multiple angles it is possible to provide dynamic imaging of the subject's body 210. In particular, embodiments of the disclosure may be suitable for functional imaging, such as those in which dynamic in vivo changes are detectable including changes in motion, location and/or size of organs or regions of the body, during breathing or other physiological processes of the subject's body 210, as would be appreciated by a person skilled in the art. This will be described in more detail in relation to inventive method 300 and processing of the acquired images using XV techniques.

The scanning process using the imaging device 100 of FIGS. 3 to 5 will now be described. As best shown in FIG. 4, each energy source 110A, 110B produces an imaging beam 116 which passes through the region 230 to be imaged and a projection is acquired by a corresponding detector 120A, 120B. Each energy source 110A, 110B is angled towards the region 230 to be imaged so that the imaging beams 116 are received through the same volume, which is the area of interest being imaged by all sources 110A, 110B, although from different angles or perspectives.

In the embodiments of FIGS. 4 and 5, the energy sources 110A, 110B are angled towards the region 230 to be imaged, and the corresponding detectors 120A, 120B are angled towards the respective energy sources 110A, 110B in order to acquire the images. Each of the detectors 120A, 120B are substantially aligned with the respective energy sources 110A, 110B, and in fact, directly face the respective energy sources 110A, 110B. The detectors 120A, 120B are substantially aligned with the respective energy sources such that the imaging beams 116 generated by the respective energy sources 110A, 110B are substantially orthogonal to the detectors 120A, 120B.

FIG. 5 shows the imaging device 100 of FIG. 3 in a plan view excluding the source unit 112 and detector unit 122 for clarity. FIG. 5 illustrates that the imaging beams 116 generated by the energy sources 110A, 110B intersect through an intersection region 142, which may include a single intersection point P. The intersection region 142 of the imaging device 100 will correspond to the region 230 of the subject's body 210 to be imaged. The intersection point P is not equidistant from each of the energy sources 110A, 110B and detectors 120A, 120B. In the embodiment of FIG. 5, the intersection point P is located closer to the detectors 120A, 120B than the energy sources 110A, 110B, such that the region 230 of the subject's body 210 to be imaged is in closer proximity to the detectors 120A, 120B than the energy sources 110A, 110B (see also FIGS. 1 to 4). A radius of curvature from the intersection point P to the common arc 103 on which the pair of detectors 120A are located, denoted as $R_D$, may be about 400 mm, or more particularly, about 410 mm. A radius of curvature from the intersection point P to the first arc 102 on which the pair of sources 110A are located, denoted as $R_S$, may be about 1200 mm.

The advantage of having the intersection region 142 and more particularly, the intersection point P, being closer to the detectors 120A, 120B than the energy sources 110A, 110B, is that this reduces the magnification of the images acquired by the imaging device 100. Magnification occurs when the energy sources 110A, 110B are positioned too close to the region being imaged, e.g., the region 230 of the subject 200, and the image captured exaggerates the size and dimensions of the structures. In embodiments of the disclosure, it may be desirable to reduce the magnification in order to provide a more accurate representation of the region 230 to be imaged. A posterior-anterior (PA) projection beam view allows a more accurate representation of the region 230 to be imaged, such as particularly the heart or lungs of the subject 200, as the region 230 is positioned in closer proximity to the detectors 120A, 120B and is therefore less magnified. A person skilled in the art would appreciate that the radii of curvature $R_s$ and $R_D$ may be varied as appropriate for the dimensions of the imaging device 100, although it remains preferable that the radius $R_s$ is greater than the radius $R_D$.

As shown in FIGS. 1 to 3, the detector unit 122 may include a support member in the form of a seat 124 for supporting the subject's body 210 in a seated position during image acquisition. Able-bodied subjects 200 may walk into the scanner 100 and position themselves in the seat 124 to commence the imaging process. Alternatively, subjects 200 confined to a wheelchair or having limited mobility may be transferred to the seat 124 of the imaging device 100 by an operator or technician prior to commencing the scanning process. In other embodiments, subjects 200 may be placed in a wheelchair, which is then positioned in the scanner 100 between the energy source 110 and detector 120 without requiring use of the seat 124 (not shown). The wheelchair or other seating device may include a radiolucent seat back that enables transmission of X-rays from the energy source 110 to the detector 120, for use in x-ray imaging. Alternatively, the seat back may be made of any appropriate material to enable transmission of forms of energy for medical imaging including but not limited to ultrasound waves and magnetic fields, as would be appreciated by a person skilled in the art.

Figure 6B:
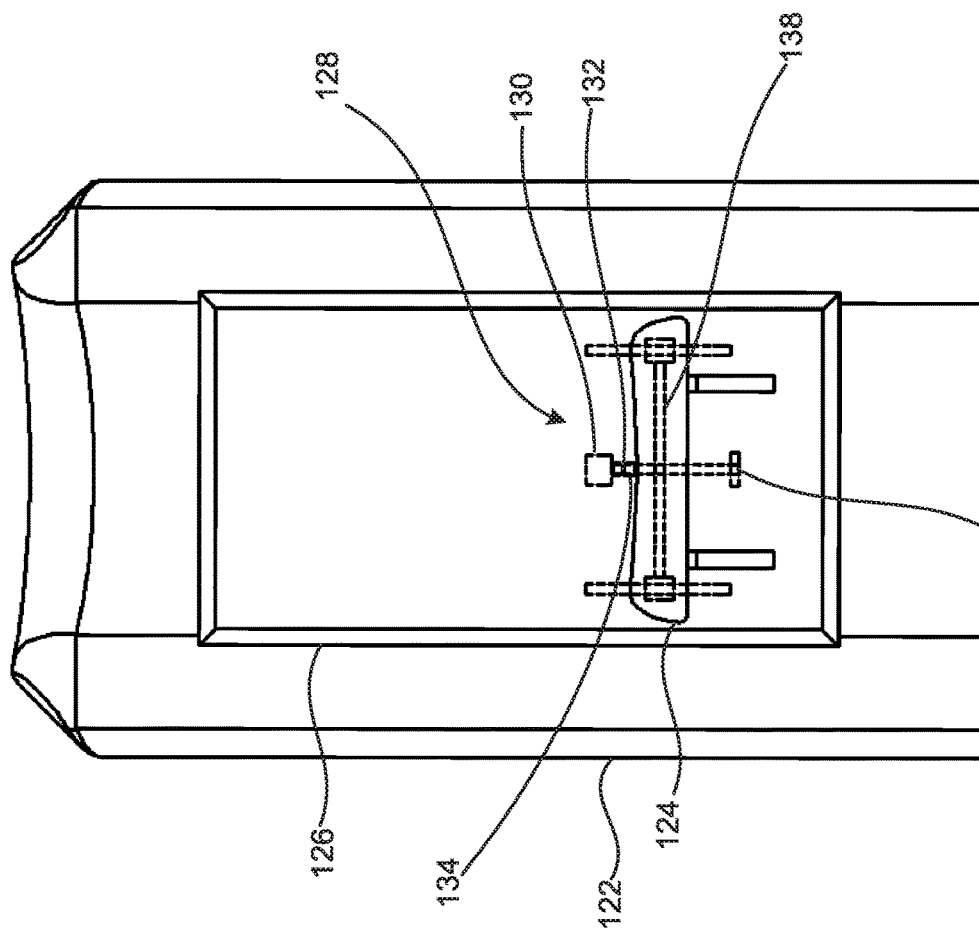
FIG. 6B shows the detector unit of FIG. 6A illustrating internal components of a support member assembly, according to some embodiments of the disclosure.
Figure 6A:
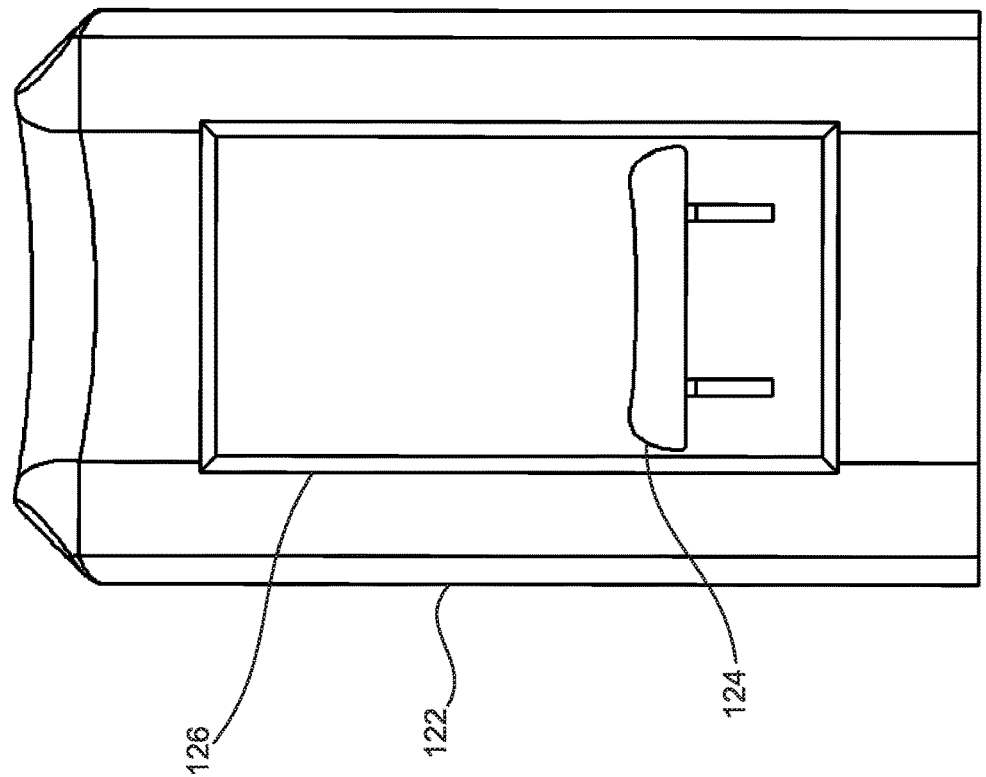
FIG. 6A is a front view of the detector unit of FIGS. 1 to 3 showing a support member for supporting the subject in a seated position for scanning, according to some embodiments of the disclosure.

FIGS. 6A and 6B show an exemplary support member for supporting the subject's body 210 at a location between the energy source 110 and detector 120 in the form of a seat 124 and a support member assembly 128, according to an embodiment of the disclosure. FIG. 6A shows the seat 124 being mounted to a panel 126, which forms part of the detector unit 122. The internal components of an exemplary support member assembly 128 are illustrated in FIG. 6B. The seat 124 may be moveable by an actuator for adjusting the position and/or orientation of the seat 124. The controller 140 (see FIG. 7) may be configured to control the actuator to adjust the position and/or orientation of the seat 124 to support the subject's body 210 at a desired location for acquiring the images.

The actuator may include a motor 130 supported by a nut 134 as shown in FIG. 6B. The motor 130 may be operable to move a mount plate 138 supporting the seat 124 on a screw 132 in a vertical direction to raise or lower the seat 124 relative to a bearing support 136. Vertical seat position adjustment may be implemented by this exemplary rotary screw mechanism that translates rotation into linear movement and is powered by the motor 130. Although not shown, the motor 130 may also be operable to move the mount plate 138 in a horizontal direction and/or tilting orientation to change the position and/or orientation of the seat 124, and consequently, the position and alignment of the subject's body 210. Embodiments of the disclosure are not limited to this particular arrangement of the support member and a person skilled in the art would appreciate that many other arrangements are possible which do not include a motor 130 as an actuator and operate on different principles to change the position and/or orientation of the seat 124 to alter the position and alignment of the subject's body 210. For example, the rotary screw mechanism may exclude the motor 130 and instead include a manually operable rotating handle as the actuator.

In other embodiments, a hydraulic or pneumatic system could be used to move the seat 124 (not shown), which is either manually operated or powered. In this arrangement, a cylinder may be provided to move the seat 124 in a vertical direction to raise or lower the seat 124, that is driven by controlling a compressed fluid, such as air, within the cylinder. In some embodiments, the imaging device 100 may include a subject support system 175 having a subject control system 176 (see FIG. 7) for controlling the compressed fluid, in addition to a fluid or air compressor (not shown). Additionally/alternatively, the seat 124 could be manually adjusted by the operator or technician. For example, a manually re-positionable seat may be provided which is able to be located and secured in pre-defined positions by an operator (not shown). Alternatively, a manually operated spring or compressible gas strut seat may be provided (not shown).

In embodiments which do not include a seat 124, the imaging device 100 may alternatively include a support member in the form of a platform for the subject 200 to stand on in an upright orientation or be positioned on in a wheelchair or other chair with a radiolucent seat back (not shown). The platform may be moveable vertically and/horizontally to raise and/or lower the subject 200 to a desired location for image acquisition, and may include a tilting function to change the orientation and/or alignment of the subject's body 210. The platform may be initially located on the ground or floor on which the imaging device 100 is positioned for the subject 200 to enter the scanner 100, and then moved vertically, horizontally and/or tilted to move the subject's body 210 to the desired location for imaging acquisition. Similar mechanisms for raising, lowering and/or tilting the platform may be employed as described above in relation to the seat 124. For embodiments which include a moveable platform, additional safety mechanisms are required to secure the patient 200 and/or minimise potential tripping hazards for the patient 200 and/or operator. For example, the platform may include a surface material with a high friction coefficient and/or texturing to providing gripping for the patient's footwear and/or a wheelchair. The platform may also include safety panels surrounding the edges to prevent falls from the platform once elevated relative to the ground or floor.

Advantageously, the imaging device 100 may enable able-bodied patients 200 to walk into the scanner, or for mobility-challenged patients 200 to be positioned in the scanner either on a seat 124 or in a wheelchair. This is substantially different to the prior art scanners, such as CT scanners, which require a patient 200 to be lying down for the scanning to be completed. Typical CT scanner arrangements employ a ring or c-shaped arm on which the energy sources and/or detectors are mounted for rotation around the patient's body. The patient is required to be positioned within the scanner at the required location for scanning a region of their body and must remain very still to capture the images. In the case of using a CT scanner to image the lungs, the patient is required to hold their breath and remain very still in order to capture a static image of the structure of their lungs. In addition, because they are lying on a bed in a supine position, their lungs are oriented in opposition to gravity which is different to the usual upright orientation adopted when the patient 200 is standing or sitting. It is much easier for the patient 200 to be positioned within the inventive scanner 100 and hold still during scanning. The inventive scanner 100 allows the patient 200 to be positioned in the scanner 100 in an upright seated or standing position, and their position and/or orientation adjusted to the desired location before scanning. In addition, as the inventive scanner 100 acquires dynamic information (to allow extraction of functional information), the patient is not required to hold their breath. Thus, the inventive imaging device 100 thus provides a more accessible scanning solution regardless of the patient's mobility and/or young age.

Figure 7:
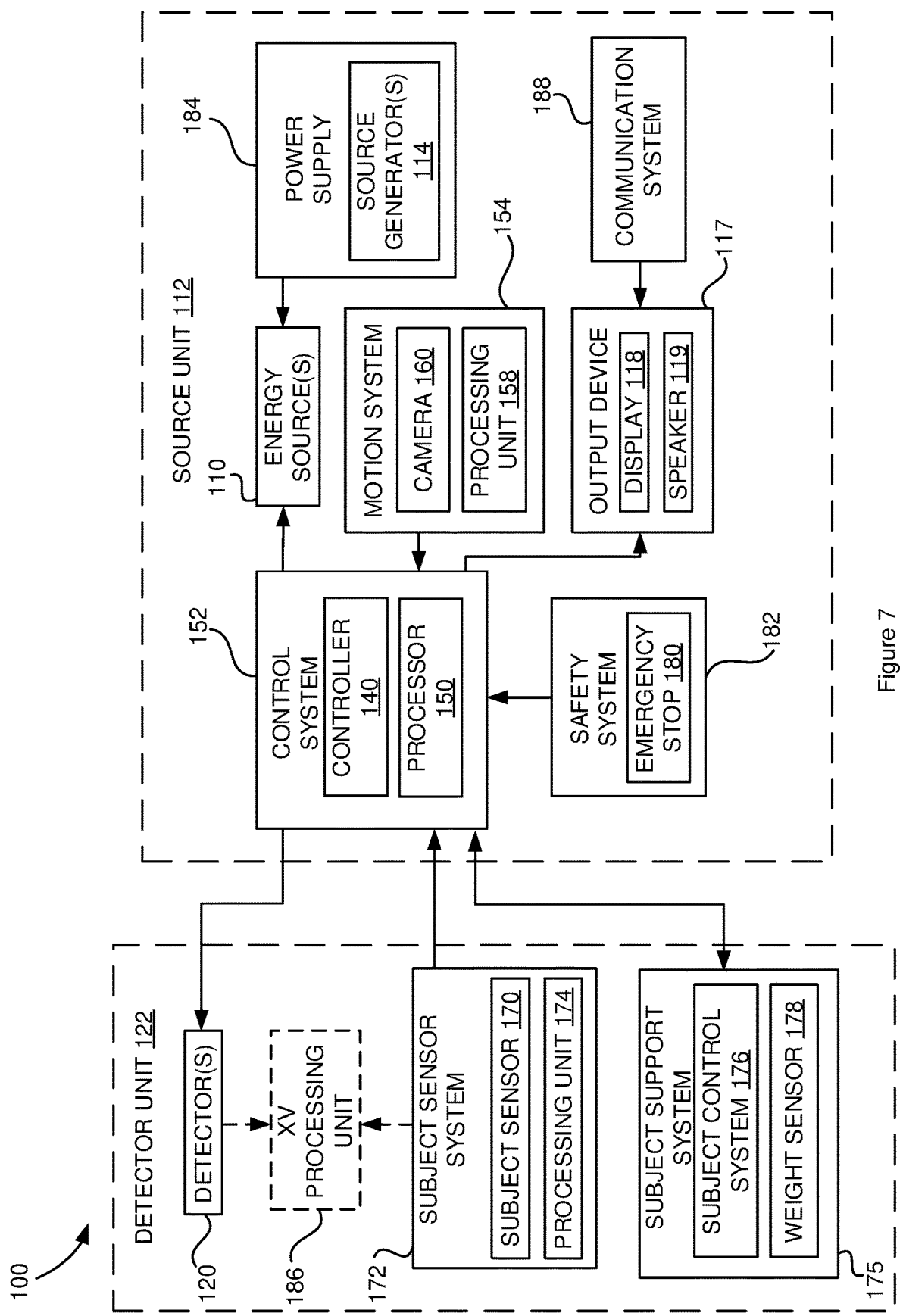
FIG. 7 shows a schematic diagram of components of a detector unit and source unit of the imaging device of FIGS. 1 to 3, according to some embodiments of the disclosure.

FIG. 7 shows a schematic diagram of components of the source unit 112 and detector unit 122 of the imaging device 100 according to some embodiments of the disclosure. The detector unit 122 and source unit 112 are shown in broken lines to indicate that this is an exemplary arrangement of the components and systems of the imaging device 100, which may vary as would be understood by the skilled addressee. For example, the XV processing unit 186 (optionally provided in the detector unit 122) and the subject sensor system 172 may instead be located in the source unit 112. Alternatively, the XV processing unit 186 may not be included in the imaging device 100 and may instead be provided via a cloud-based server having the XV processing application for off-board processing of the image data. Moreover, in some embodiments, the control system 152, the safety system 182, the output device 117 and the communication system 188 of the source unit 112 may instead be located in the detector unit 122.

The processor 150, and processing units 158, 174 and 186 of FIG. 7 used to implement certain steps of the method 300 of embodiments of the disclosure (see FIGS. 8 to 11) and performed in the functioning of the imaging device 100 may include a micro-processor or the like configured to receive data from components of the device 100 or a computing server, such as through a wireless or hard-wired connection (not shown). The controller 140 may include a programmable logic controller (PLC) and/or an embedded PCB (not shown). The controller 140 may contain or store a number of predefined protocols or steps in a non-volatile memory such as a hard drive. Protocols may be programmable by an operator to implement a number of steps for the method 300 (denoted as methods 300A and 300B in FIGS. 8 and 9 and as method 300 in FIGS. 10 and 11) as performed by the processors 150, 158, 174 and 186, or they may be pre-defined. Additionally/alternatively, the controller 140 and processors 150, 158, 174 and 186 may include any other suitable processor or controller device known to a person skilled in the art. The steps performed by the processors 150, 158, 174 and 186 may be implemented through a controller 140 and further in software, firmware and/or hardware in a variety of manners as would be understood by a person skilled in the art.

FIG. 7 also excludes some additional components and systems which would form part of the imaging device 100 to simplify the diagram. For example, the imaging device 100 may include one or more memory devices (not shown) in order to store various types of data including sensor data, image data and prior-acquired patient data, and also software instructions for performing image acquisition processing workflows, XV processing and the inventive algorithm performed by the processor 150 of embodiments of the disclosure, as will be described in more detail. The schematic diagram of FIG. 7 also omits some of the internal bus lines between various components and systems for simplicity. The excluded aspects would be appreciated by a person skilled in the art who would be able to readily supply the omitted software, firmware and/or hardware.

The source unit 112 may include one or more energy sources 110 which are powered by one or more source generators 114 forming part of a power supply 184 for the imaging device 100. A control system 152 having the controller 140 and processor 150 may be configured to operate the energy source(s) 110 and detector(s) 120 of the detector unit 122 for scanning the region 230 of the subject's body 210. The source unit 112 may also include a safety system 182 in communication with the control system 152. The safety system 182 may include an emergency stop 180 in the form of a software or hardware component of the imaging device 100.

FIG. 1 shows an embodiment of an emergency stop 180 on a surface of the source unit 112 adjacent the subject 200. The emergency stop 180 may include an actuator, such as a depressible button or switch, for powering off the imaging device 100 in the event of an emergency. The depressible button or switch may remain depressed for the scan duration, independent of the device generated scan start and scan stop trigger signals. If the emergency stop 180 is actuated, the controller 140 of control system 152 may be operable to stop acquisition of the images via the energy source(s) 110 and optionally, directly switch off power to the imaging device 100 via the power supply 184 (not shown), in order to prevent inadvertent generation of radiation.

According to the second inventive aspect, the imaging device 100 may include at least one sensor for detecting position and/or orientation of the subject's body 210 located between the energy source(s) 110 and detector(s) 120. The imaging device 100 may also include at least one processor 150 configured to determine timing of the image acquisition based at least on the detected position and/or orientation of the subject's body 210.

The sensor for detecting position and/or orientation may include one or more of: a camera, a light sensor, a motion-based sensor, and a laser sensor, to name a few. As shown in FIG. 7, the sensor for detecting position and/or orientation may include one or more motion sensor(s) in the form of a camera 160, with a processing unit 158 for processing the sensor data, which together form a motion system 154 according to an embodiment of the disclosure. The sensor data from the motion system 154 may be processed and then used by the control system 152 for determining timing of the image acquisition based at least on a detected position and/or orientation of the subject's body 210. Thus, the imaging device 100 may include one sensor for detecting position and/or orientation of the subject's body 210, and another sensor for monitoring the physiological parameter, which may both be used to determine timing of the image acquisition once the subject 200 is in the desired location for scanning and the trigger signal for acquisition has been determined from the monitored physiological parameter.

As shown in FIG. 1, a camera 160 is shown on a surface of the source unit 112 adjacent the subject 200. The camera 160 may operate by visible light or infra-red radiation to visually detect the position and/or orientation of the subject's body 210 between the energy source(s) 110 and detector(s) 120. Preferably, the camera 160 is a video camera system with depth information (e.g., combined video camera with LIDAR, Microsoft Kinect type system, stereo camera setup, etc.) which allows visualisation of the position and/or orientation of the subject 200, as well as the motion of the subject 200. The camera 160 may form part of a real-time motion-based vision system 154 which may use fiducial reference markers positioned behind the subject 200 to locate the position of the top of their head and to find the perimeter around the subject 200 (not shown). Furthermore, in other embodiments, a laser sensor may be additionally included which provides a laser curtain to visually detect the position of the subject 200 for imaging (not shown), such as using the Lidar (Light Detection and Ranging) method. Additionally/alternatively, an ultrasonic sensor may be provided to detect the position of the subject 200 for imaging through non-contact distance sensing via ultrasonic energy.

In an exemplary embodiment, the motion system 154 is a real-time vision system including the camera 160, and optionally, additional sensors such as a laser sensor, for positioning the subject 200 within the field of view (FOV) of the detectors 120 of the imaging device 100 at the desired location for scanning. The vision system may acquire 2D or 3D image data using the camera 160 and/or additional sensors, ideally process the data in real-time to locate and measure key patient reference points. The real-time image processing may employ known techniques such as edge detection, pose estimation and facial detection to locate key patient features, to name a few. The processing unit 158 may process the sensor data to create a trace of the perimeter of the subject 200 as they are seated, or optionally standing, between the energy source(s) 110 and detector(s) 120 and calibrate this trace against fiducial reference markers which are located behind where the subject 200 is seated or standing, such as on the detector unit 122 (not shown). In order to estimate the position of the region 230 for imaging, the processing unit 158 may receive prior-acquired data, as will be described in more detail, such as lung location reference data for the patient 200, obtained from previous scans where available, or from published anthropometric body dimension and lung size data for various patient ages and dimensions. The patient key feature locations and lung location reference data will be input to the processing unit 158 and/or processor 150 in conjunction with the fixed fiducial data to determine direction and/or magnitude of movement required to position the subject 200 in a desired location for scanning. Based on this data, an estimated current position of the region 230 of the subject's body 210 to be imaged can be calculated, such as the lung position to be imaged, and the seat 124 or platform position can be adjusted to a desired location for scanning, either autonomously by the scanner 100 or by the operator's control.

Advantageously, the sensor for detecting position and/or orientation of the subject's body 210 uses an energy source and/or technique which does not require the use of X-rays. Prior art techniques require live (i.e., constant) x-ray imaging to be performed of the subject's body 210 to determine if the region 230 to be imaged is within the scanner's field of view (FOV). The inventive scanner 100 does not require this live x-ray imaging to be performed and thus, reduces the use of X-rays in the scanning process. This reduces the burden of radiation on the subject 200 and allowing more scans to be completed with a lower overall burden of radiation. In particular, this is highly beneficial for younger patients for which radiation is more damaging to their bodies.

In alternative embodiments, the imaging device 100 may be configured to perform a preliminary scan of the subject's body 210 to determine if the region 230 to be imaged is in the field of view (FOV). The controller 140 may be configured to acquire a preliminary scan of the subject 200, for example a single x-ray image from a single projection acquired from a source/detector pair. The processor 150 may then be configured to process the image data and identify the region 230 to be imaged, such as based on image intensity, location, or bounding box techniques, to name a few, and determine an adjustment of the subject's body 210 to a desired location for acquiring the time series of images. Beneficially, the controller 140 may be configured to move the subject 200 automatically, by adjusting the seat 124 or platform position/orientation, to the desired location for scanning instead of the operator manually moving the subject 200 or the subject 200 being supplied with instructions. The controller 140 may further be configured to, once the subject 200 has been moved to the desired location for scanning, acquire a second preliminary scan of the subject 200 to determine if the region 230 to be imaged is now in the field of view (FOV).

The source unit 112 may also include an output device 117, such as an audio-visual device, which may include a display 118 and a speaker 119. FIG. 1 shows a display 118 located below the camera 160 in the subject's line of sight when positioned in the scanner 100. Although not shown, the imaging device 100 may also include a speaker 119 positioned in the source unit 112 and/or the detector 122. The output device 117 is provided to enable communications to be delivered to and/or from the subject 200 and/or operator and the imaging device 100 via a communication system 188. For example, the control system 152 via the processor 150 may output instructions to the subject 200 and/or operator via the output device 117. The instructions may be provided on the display 118 and/or via the speaker 119. The instructions provided may include adjustments to be made to the subject's position and/or orientation in the scanner 100 to provide the subject's body 210 at a desired location within the scanner 100 for acquiring the images. For example, the output device 117 may provide body positioning instructions to the subject 200, including instructions to straighten their body, e.g., correct any tilt or angle of their body side-to-side or forwards/backwards relative to their sitting or standing position in the scanner 100. The instructions may also relate to timing of the image acquisition, such as a trigger signal for commencing image acquisition. For example, the output device 117 may provide breathing instructions to the subject 200, including instructions to breathe in and out, and preferably, to breathe at a specific rate in order to provide a regular breathing pattern.

It would be advantageous for the scanner 100 to provide fully automated positioning of the subject's body 210 for acquiring the images in some embodiments of the disclosure. For example, the subject 200 may be seated on the seat 124 which then automatically adjusts the position, orientation (e.g., tilt/angle) and/or alignment of the subject 200 for optimal scanning of the region 230. However, in the event that the scanner 100 cannot provide full automation, it is desirable to provide a useful communication system 188 for assisting the patients 200, particularly younger patients and/or those with reduced intellectual capacity, to be provided with visual instructions on the display 118 in addition to verbal instructions via the speaker 119. Prior art techniques simply require the technician or operator to explain to the patient how to change their position for optimising image acquisition. For younger patients and/or those with reduced intellectual capacity, this is a difficult task as they are likely to respond more positively to visual instructions and/or animations. Furthermore, the graphical display 118 and/or speaker 119 also provides the opportunity to make the patient 200 more comfortable during the procedure by explaining the steps as the scanning progresses.

Although not shown, the imaging device 100 may also include an input device for providing data input from the subject 200 and/or operator. The data input may include prior-acquired data, which may include data associated with the subject 200 and/or data associated with a generic or normative population with representative characteristics of the subject 200. For example, the prior-acquired data may include one or more prior-acquired images of the region 230 of the subject's body 210 to be imaged. The prior-acquired images may include CT images or previous XV scans, which provide precise anatomical locations of the subject's body 210 and relevant metadata. Additionally/alternatively, the prior-acquired data may include one or more physical characteristics of the subject 200, such as anatomical dimensions of the region 230 and/or subject's body 210, height, and/or weight of the subject 200. The anatomical dimensions may include, for example, the dimensions of an organ of the subject 200 such as the lungs, or a particular part of the lungs being imaged. Furthermore, the prior-acquired data may also include one or more attributes of the subject 200 including age, gender, mobility, ethnicity, disease status and/or medical history. The physical characteristics and attributes of the subject 200 may be derived from data associated with a generic or normative population. The prior-acquired data may be used in the process of optimising image acquisition, which will be described in more detail.

As shown in FIG. 7, the detector unit 122 includes one or more detectors 120 operable by the controller 140 of the control system 152 for acquiring a time series of in vivo images of the region 230 of the subject's body 210. The images acquired may be used as an input to the XV processing unit 186, as previously described, for producing XV three-dimensional motion fields of the region 230 of the subject's body 210, such as the lungs or heart. The XV processing unit 186 may alternatively be provided off-board via a server or cloud-based system in some embodiments.

The detector unit 122 may also include a subject support system 175 having a subject control system 176 (shown in FIG. 7) for controlling positioning of the support member (e.g., seat 124 of FIGS. 1 to 3 or a platform), such as through the support member assembly 128 and actuator including a motor 130 previously described and shown in FIG. 6B. Thus, the controller 140 of control system 152 of the source unit 112 may be operable to control the actuator, optionally automatically, to adjust positioning and/or orientation (e.g., tilt/angling) or alignment of the seat 124 via the subject support system 175 and control system 176. Furthermore, the subject support system 175 may include a weight sensor 178 located in the seat 124 or platform. The weight sensor 178 may be a force or pressure sensor or transducer for detecting the subject's weight when the subject's body 210 is positioned on the seat 124 or the platform. Sensor data from the weight sensor 178 may be provided as an input to the control system 152 of the source unit 112 for use in optimising acquisition of the images as will be further described.

According to the first inventive aspect, the imaging device 100 may include at least one sensor for monitoring a physiological parameter associated with the region 230 of the subject's body 210 to be imaged. The imaging device 100 may also include at least one processor 150 configured to determine timing of the image acquisition based at least on the monitored physiological parameter.

The at least one sensor for monitoring the physiological parameter may be located in the detector unit 122 as indicated by the subject sensor 170 shown in FIG. 7. The subject sensor 170 may be operated by a subject sensor system 172, also having a processing unit 174 for providing sensor data for processing by the processor 150 of the control system 152 of the source unit 112. The subject sensor 170 may be configured to monitor a physiological parameter associated with the region 230 of the subject's body 210 to be imaged. The physiological parameter may include airflow or blood pressure. When the region 230 to be imaged includes the lungs, the physiological parameter may include airflow at the mouth, spirometry, chest wall measurements using a laser generated grid or image, or a band around the thorax, for fitting to standard respiration curves. When the region 230 to be imaged includes the heart or blood vessels, the physiological parameter may include measurements of blood pressure or blood flow. Additionally/alternatively, many other monitoring means for various physiological parameters could be used, as would be appreciated by a person skilled in the art, such as using ECG to infer temporal variations of blood volume for imaging the heart.

The subject sensor 170 may be configured to detect a physiological parameter associated with the subject's breathing. In particular, sensor data may be analysed by the processor 150 for detecting a breathing pattern of the subject 200 and/or duration of the subject's breath. The timing of image acquisition is then determined based on the detected breathing pattern and/or duration of the subject's breath. More particularly, the image acquisition may be based on monitoring the detected breathing pattern and/or typical duration of the subject's breath to determine if a repetitive breathing pattern is detected and from that, analysing the repetitive breathing pattern to identify one or more characteristics of the breathing cycle, such as the start of inspiration for commencing the scan and the end of expiration for stopping the scan. This data may be used to generate a breath cycle trigger signal for the image acquisition. The imaging device 100 and method 300 may acquire images over part of a breath (e.g., only inspiration or expiration phases of the breathing cycle) or over a full breath (i.e., both inspiration and expiration phases of the breathing cycle). This process will be described in more detail in relation to the imaging method 300 of embodiments of the disclosure shown in FIGS. 8 to 11.

FIG. 2 shows a connector 190 for the sensor 170 for monitoring the physiological parameter (not shown) to be provided by the imaging device 100. Accordingly, in some embodiments, the sensor 170 may not be included as part of the imaging device 100 and instead connect to the device 100 via the connector 190. The connector 190 may enable electrical, mechanical and/or gaseous connection of the sensor 170 to the imaging device 100 for operation. The sensor 170 may be positionable near and/or within the subject's mouth for detecting a physiological parameter associated with the subject's breathing. For example, the sensor 170 may be a flowmeter for monitoring air flow changes associated with the subject's breathing. The flowmeter may include a spirometer. Additionally/alternatively, the sensor 170 may include a gas sensor for monitoring gaseous changes in the air content associated with the subject's breathing. A gas content sensor may be placed near the subject's mouth to detect the concentration of carbon dioxide or oxygen entering/exiting the subject's mouth. This may enable the scanner 100 to detect the subject's breathing patterns.

In some embodiments, the sensor 170 may include a thermal sensor, such as an infra-red thermal camera, which is mounted to be directed at the subject's mouth. The thermal sensor may monitor temperature changes of the air associated with the subject's breathing as it is known and understood that cooler air enters the mouth upon inspiration and that warmer air exits the mouth upon expiration. To improve the accuracy of the thermal camera measurement, a temperature sensor, such as a thermocouple, resistance temperature detector (RTD) or similar metallic-based device, may be placed near the subject's mouth which will respond to the temperature changes caused by breathing. This may allow the thermal camera to more effectively measure the inspiration and/or expiration of the subject 200.

Figure 8:
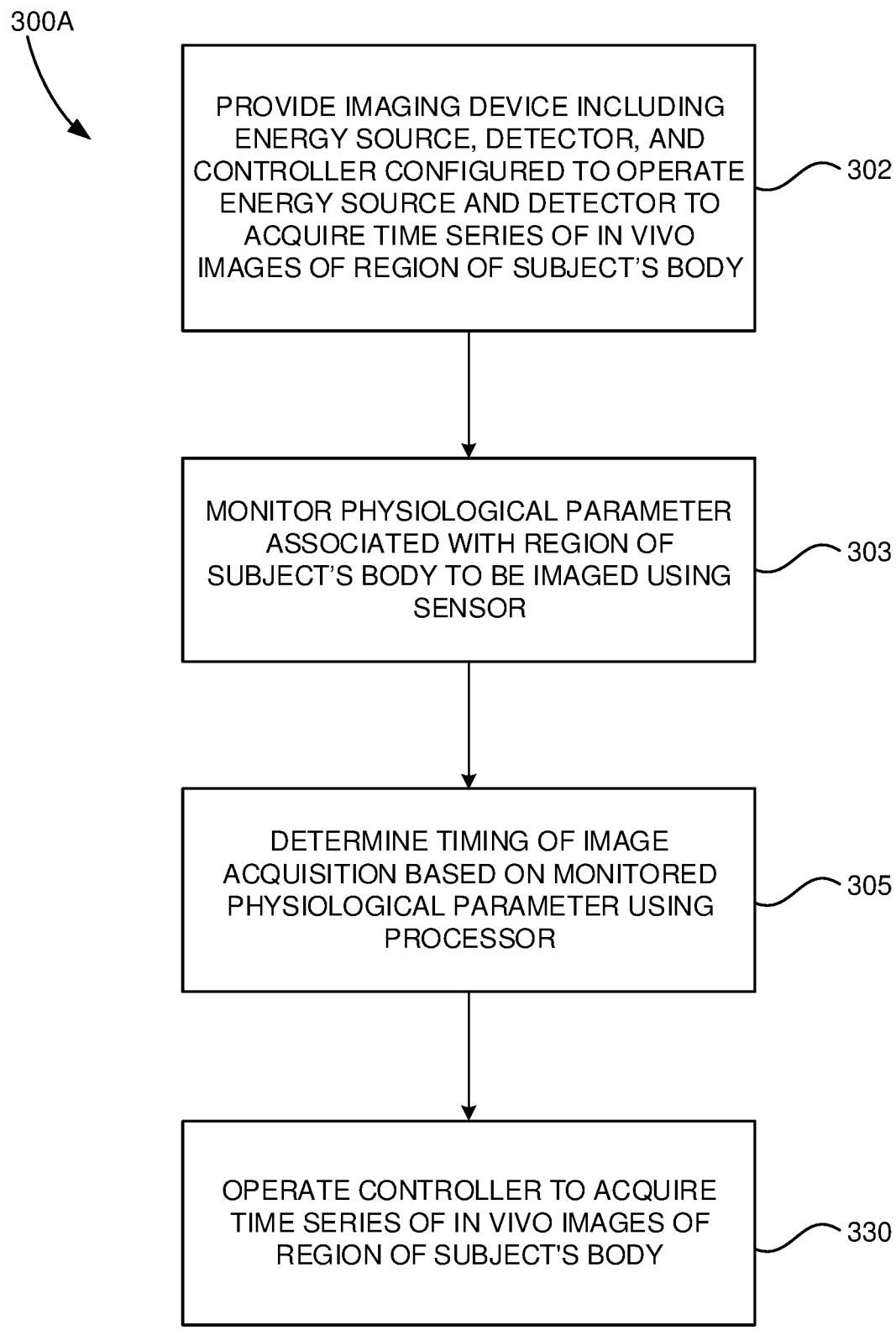
FIG. 8 is a flow chart showing steps in a method for imaging where timing of the image acquisition is based at least on a monitored physiological parameter, according to some embodiments of the disclosure.
Figure 9:
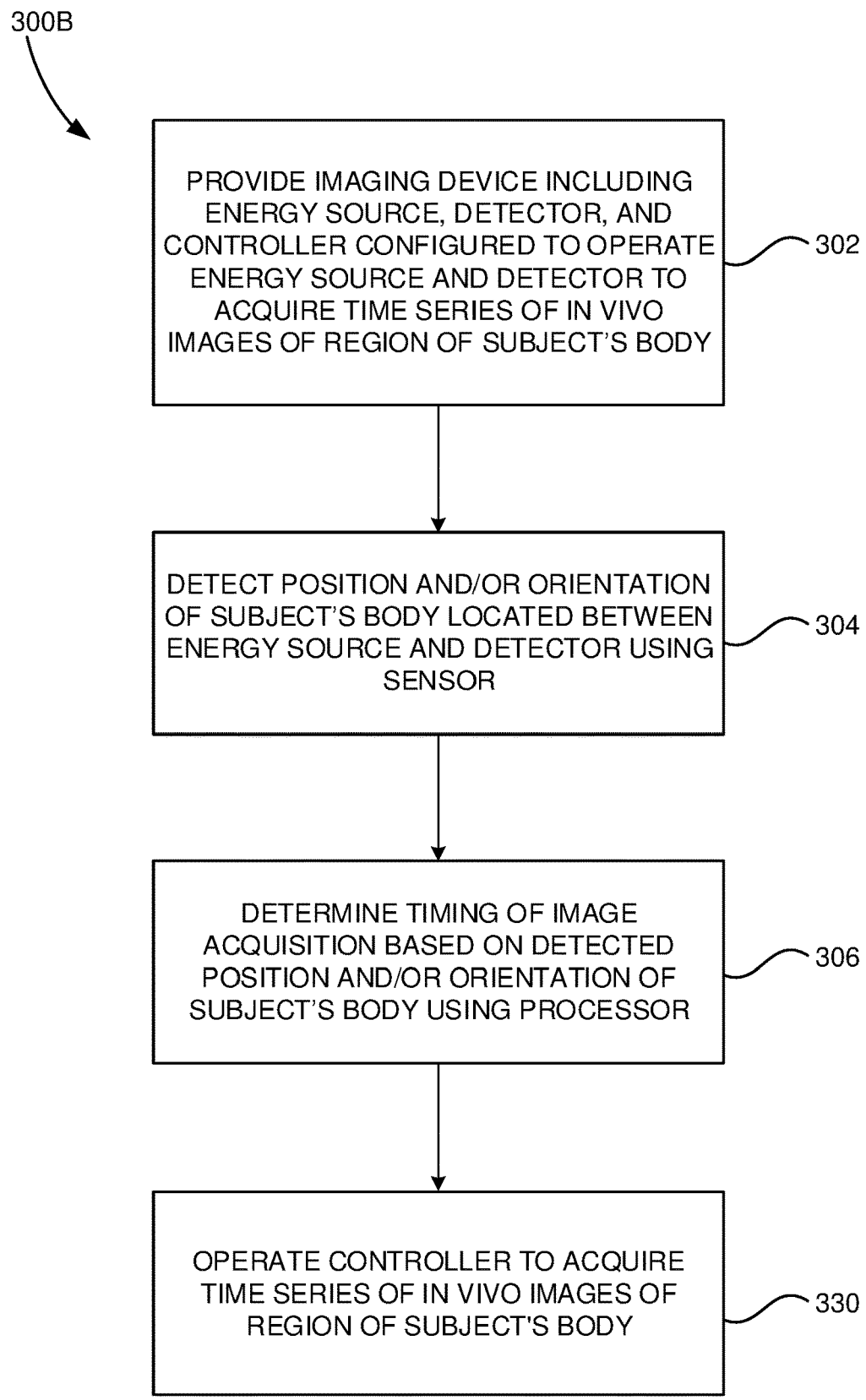
FIG. 9 is a flow chart showing steps in a method for imaging where timing of the image acquisition is based at least on a detected position and/or orientation of the subject's body, according to some embodiments of the disclosure.

Turning now to FIGS. 8 to 11, the imaging device 100 and steps performed by the processor(s) 150, 158, 174 and/or 186, will now be described in more detail in relation to exemplary methods 300A and 300B for imaging as shown in FIGS. 8 and 9, according to some preferred embodiments of the disclosure.

FIGS. 8 and 9 illustrate methods 300A and 300B, respectively, for acquiring in vivo images of a region 230 of a subject's body 200 according to some preferred embodiments of the disclosure. The methods 300A and 300B include a first step 302 of providing an imaging device 100 including at least one energy source 110, at least one detector 120 for detecting energy from the at least one energy source 110 passing through the region 230 of the subject's body 210 located between the energy source 110 and detector 120, and a controller 140 configured to operate the at least one energy source 110 and the at least one detector 120 to acquire a time series of in vivo images of the region 230 of the subject's body 210. The methods 300A and 300B also include a final step 330 of operating the controller 140 to acquire the time series of in vivo images of the region 230 of the subject's body 210.

FIG. 8 is directed to the first inventive aspect as described in relation to embodiments of the disclosure above of imaging device 100. The method 300A includes after the step 302, a step 303 of monitoring, using at least one sensor, a physiological parameter associated with the region 230 of the subject's body 210 to be imaged. The method further includes the step 305 of determining timing of the image acquisition based at least on the monitored physiological parameter using at least one processor 150. Timing of the image acquisition may be based solely on the monitored physiological parameter.

FIG. 9 is directed to the second inventive aspect as described in relation to embodiments of the disclosure above of the imaging device 100. The method 300B includes after the step 302, a step 304 of detecting, using at least one sensor, position and/or orientation of the subject's body 210 located between the energy source 110 and detector 120. The method further includes the step 306 of determining timing of the image acquisition based at least on the detected position and/or orientation of the subject's body 200 using at least one processor 150. Timing of the image acquisition may be based solely on the detected position and/or orientation. However, as will be described, the methods 300A and 300B may be combined to provide a method 300 (as per FIGS. 10 and 11) that incorporates both the first and second inventive aspects, that is, the timing of the image acquisition is based on both the monitored physiological parameter and detected position and/or orientation of the subject's body 210.

Figure 10A:
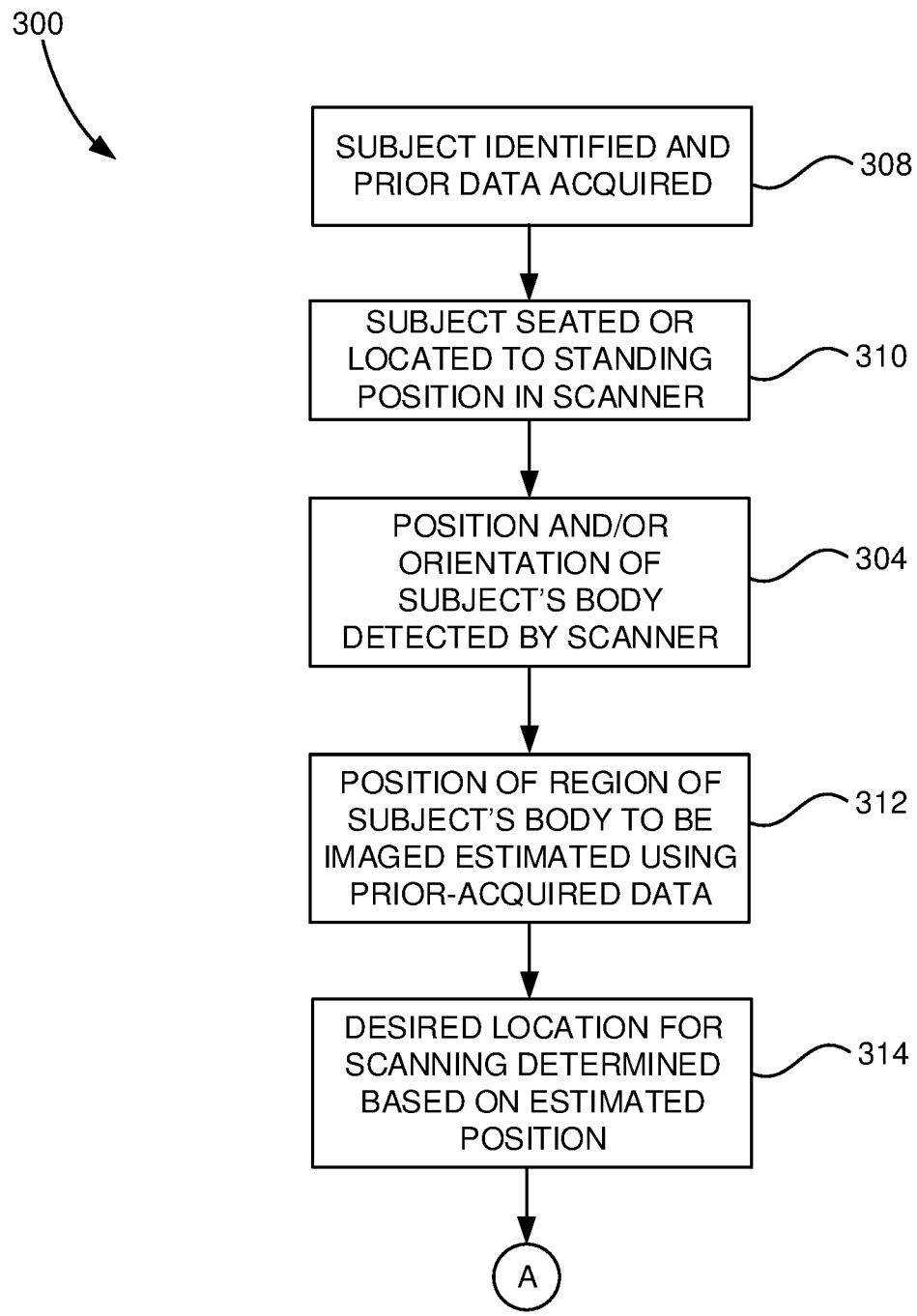
FIGS. 10A and 10B are flow charts showing steps in the method of FIG. 9 for positioning of the subject's body in a desired location for scanning, according to some embodiments of the disclosure.
Figure 10B:
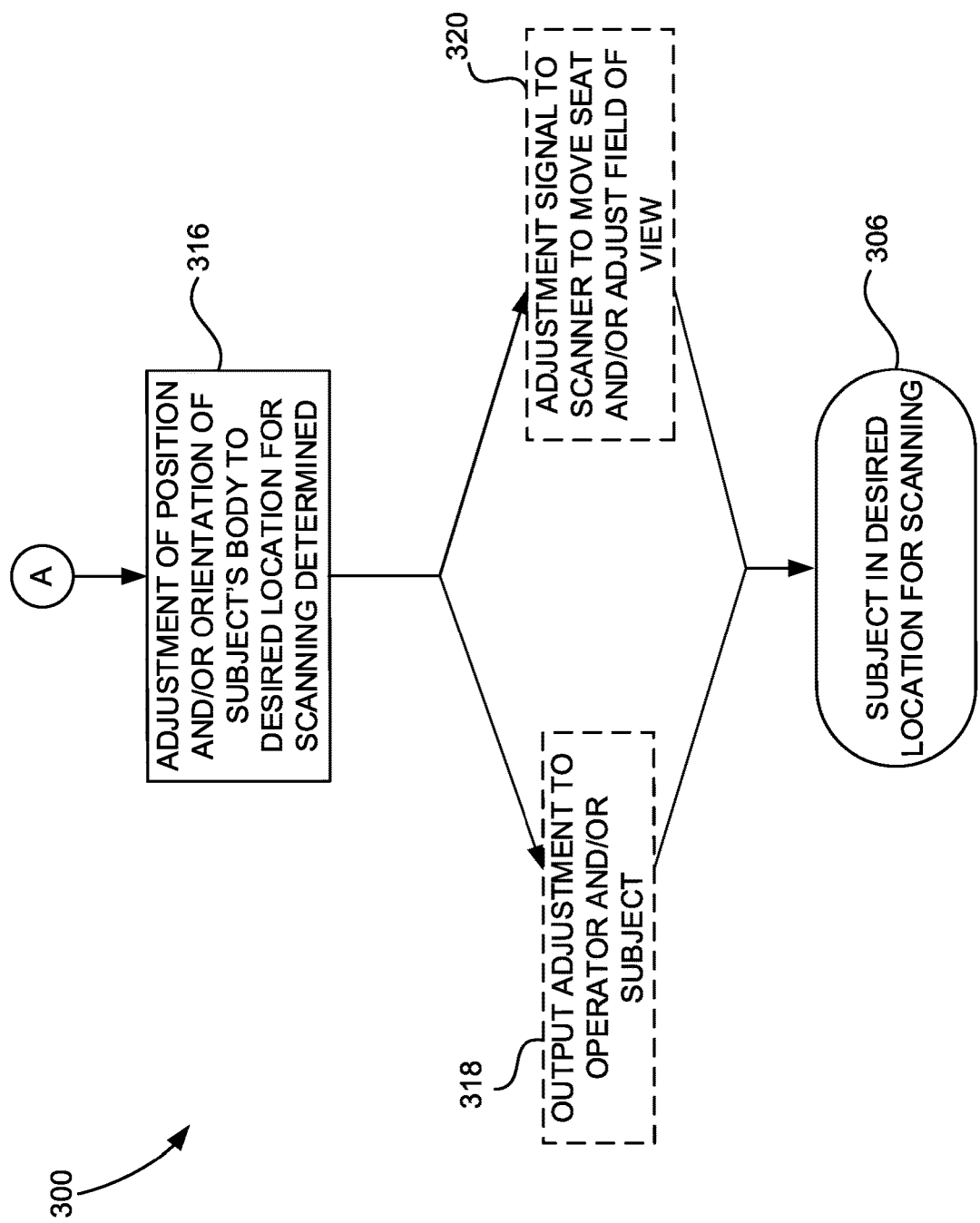

FIGS. 10A and 10B are flow charts showing steps in the method 300B of FIG. 9 for positioning of the subject's body 210 in a desired location for scanning, according to some embodiments of the disclosure.

Referring to FIG. 10A, at step 308 the method 300 includes identifying the subject 200 and acquiring prior data associated with the subject 200. The subject 200 may be identified either manually or through barcode or RFID scanning of their patient tag or label. This step may include the operator providing prior data as an input to the processor 150 of the imaging device 100. The operator may input prior data either based on their manual assessment of the subject 200 or from prior reports or data sources. Additionally/alternatively, the prior data may be acquired automatically by the processor 150 through the imaging device 100 querying a server having a database storing patient data. The prior-acquired data may include data associated with the subject 200 and/or data associated with a generic or normative population with representative characteristics of the subject 200.

The prior-acquired data may include one or more of the subject's attributes, including age, gender, mobility, ethnicity, disease status and/or medical history. Prior data may also be based on the physical characteristics of the subject 200 such as anatomical dimensions of the region 230 to be imaged and/or subject's body 210, or the subject's height and/or weight. Additionally/alternatively, the prior data may include one or more prior-acquired images of the region 230 to be imaged, such as CT scans or prior XV processed scans if available. In particular, prior image data is important for use in the algorithm for optimising the scan which is performed by the processor 150. A previous scan would be expected to include precise information regarding the location of the region 230 to be scanned and relevant metadata of the subject 200.

The prior data inputted into the imaging device 100 forms part of the scanner setup. For example, the mobility status determines whether or not the seat 124 will be required, and/or if a wheelchair or other seat with a radiolucent seat back may be necessary. Furthermore, the age of the subject 200 is important for determining the level of communication to be provided by the communication system 188 for adjusting the subject's position and/or alignment in the scanner 100 and explaining various steps in the scanning procedure. For example, a young subject 200 will require simpler explanations or graphic illustrations on the display screen 118 of where and how they should adjust the position of their body 210 for the image acquisition. Older patients 200 may only require verbal instructions via a speaker 119. The communication system 188 may provide scanner to patient communication or two-way technician to patient communication. Advantageously, the imaging device 100 utilises the communication system 188 to provide patient interaction and clear explanation of the scanning process, which is particularly helpful and user-friendly for young patients, such as those 3 years and older.

The next step 310 in the method 300 is for the subject 200 to be seated or located to a standing or upright position in the scanner 100. For able-bodied patients, they may simply walk into the space between the energy source(s) 110 and detector (s) 120 and sit down on the seat or chair 124 or alternatively, position themselves in a standing or upright position for the image acquisition. For wheelchair or limited mobility patients, the operator may assist with transfer to the seat 124 or a wheelchair with radiolucent seat back may be provided and positioned in the scanner 100. After this step is complete, either the operator or the communication system 188 advises the subject 200 of the estimated duration of the scan.

Step 304 in the method 300B includes detecting the position and/or orientation of the subject's body 210 using at least one sensor. This step may include acquiring data concerning the patient's initial position or location upon entering the scanner 100. For example, the seated patient's weight may be acquired using the weight sensor 178 of the subject support system 175. The current seat position height may also be acquired via the support control system 176. This initial data may be provided as an input to the processor 150 for performing an algorithm for optimising the scan. As previously described, the initial position and/or orientation of the subject's body 210 may be detected via the first sensor, e.g., a camera 160 as shown in FIG. 1, and accompanying motion system 154. The camera vision may enable identification of the position and/or orientation of the subject's body 210. Advantageously, the camera 160 preferably operates on the basis of visible light or infra-red light. This beneficially avoids the need for conducting a preliminary scan of the subject's body using the imaging device 100, which in existing imaging systems, such as fluoroscopy, involves using X-rays at low-dose by the scanner to manually position the subject. Thus, the inventive imaging device 100 and method 300 may avoid the usage of X-rays for the purpose of locating and adjusting the position of the subject's body 210, limiting their use to scanning once the subject 200 is in a desired location or correct positioning.

Once the initial position and/or orientation of the subject's body 210 is detected, the next step 312 of the method 300 is to estimate a position of the region 230 of the subject's body 210 to be imaged using the prior-acquired data from the scanner setup. For example, when the region 230 is the lungs or part of the lungs of the subject 200, prior image data may be used to accurately estimate the position of the subject's lungs. This estimated position may then be combined with the first sensor data indicating the subject's initial position/orientation and used to determine a desired location for scanning at step 314 of the method 300. In some embodiments, the position of the patient's lungs may be estimated from identification of the perimeter of the subject's body 210 via the sensor 160, or from particular features such as the shoulders or head of the subject 200, using a motion system 154.

In FIG. 10B, the method 300 continues at step 316 which includes using the processor 150 to determine an adjustment of the initial position and/or orientation of the subject's body 210 to the desired location between the energy source(s) 110 and detector(s) 120 for acquiring the images of the region 230 of the subject's body 210. The adjustment is determined based on a comparison of the initial detected position and/or orientation of the subject's body 210 and the desired location determined at step 314, which was derived from the estimated position of the region 230 at step 312.

The next steps of the method 300 include one or both of steps 318 and 320 (as indicated by broken lines) to arrive at the subject 200 being positioned in the desired location for scanning of step 306 of FIG. 9. At step 318, the method 300 includes outputting instructions on the output device 117, such as to the display device 118 and/or speaker 119, for the operator and/or subject 200 to adjust the subject's position and/or orientation to the desired location for acquiring the images. In this embodiment of the method 300, the subject 200 may be in an upright or standing position, or located in a wheelchair positioned in the scanner 100. The operator and/or subject 200 may move the subject's body 210 to the desired location without any automation from the imaging device 100. Additionally/alternatively, the subject 200 may be seated in the seat 124 or positioned on a platform, and the imaging device 100 at step 320 may perform a vertical adjustment of the subject's position. The operator and/or subject 200 may then receive the horizontal adjustment instructions and/or change in alignment for positioning the subject's body 210 at the desired location. Additionally/alternatively, the imaging device 100 may be configured to provide a horizontal adjustment of the subject's position or tilting side-to-side or forwards/backwards in order to straighten the subject's posture in the scanner 100. These may also be provided as instructions to the operator and/or subject 200 to move the subject's body 210 to the desired location for scanning.

In other embodiments, only step 320 may be performed, and the adjustment step is fully automated by the imaging device 100. Accordingly, the controller 140 may be configured to automatically adjust the position and/or orientation of the seat 124 or a platform on which the subject 200 is positioned using the support assembly 128 or actuator optionally including a motor 130, to support the subject's body 210 at the desired location for acquiring the images. In alternative embodiments in which a seat 124 or platform is not provided, the upright patient's position may be adjusted by means of adjusting settings on the scanner 100. For example, the processor 150 may output instructions to the operator to adjust the scanner settings, for example adjusting the collimation settings to change the field of view of the scanner. In other embodiments, the scanner 100 may automatically adjust the scanner settings without any input from the operator.

In some embodiments (not shown), the method 300 may include the step of changing the magnification of the imaging device 100. This step is preferably performed once the patient 200 is in the desired location for scanning. The magnification may be adjusted to ensure that the region 230 of the subject 200 to be imaged (e.g., the lungs) is positioned in the field of view (FOV) of each of the detectors 120. The method 300 may include the step of moving the subject 200 either towards the detectors 120 (i.e., to reduce magnification) or away from the detectors 120 (i.e., to increase the magnification). The subject 200 can be moved using the seat or chair 124 (e.g., manually by the operator or automatically by the imaging device 100 via the controller 140) or moving the patient's body 210 (e.g., by the operator or imaging device 100 providing instructions to the patient 200, or the operator moving the patient's body 210).

The patient 200 being positioned closer to the detectors 120 than the energy sources 110 reduces the magnification of the images acquired by the imaging device 100. Magnification occurs when the energy sources 110 are positioned too close to the region being imaged, e.g., the region 230 of the subject 200, and the image captured exaggerates the size and dimensions of the structures. In this example, it may be desirable to reduce the magnification in order to provide a more accurate representation of the region 230 to be imaged. A posterior-anterior (PA) projection beam view allows a more accurate representation of the region 230 to be imaged, such as particularly the heart or lungs of the subject 200, as the region 230 is positioned in closer proximity to the detectors 120 and is therefore less magnified.

Figure 11:
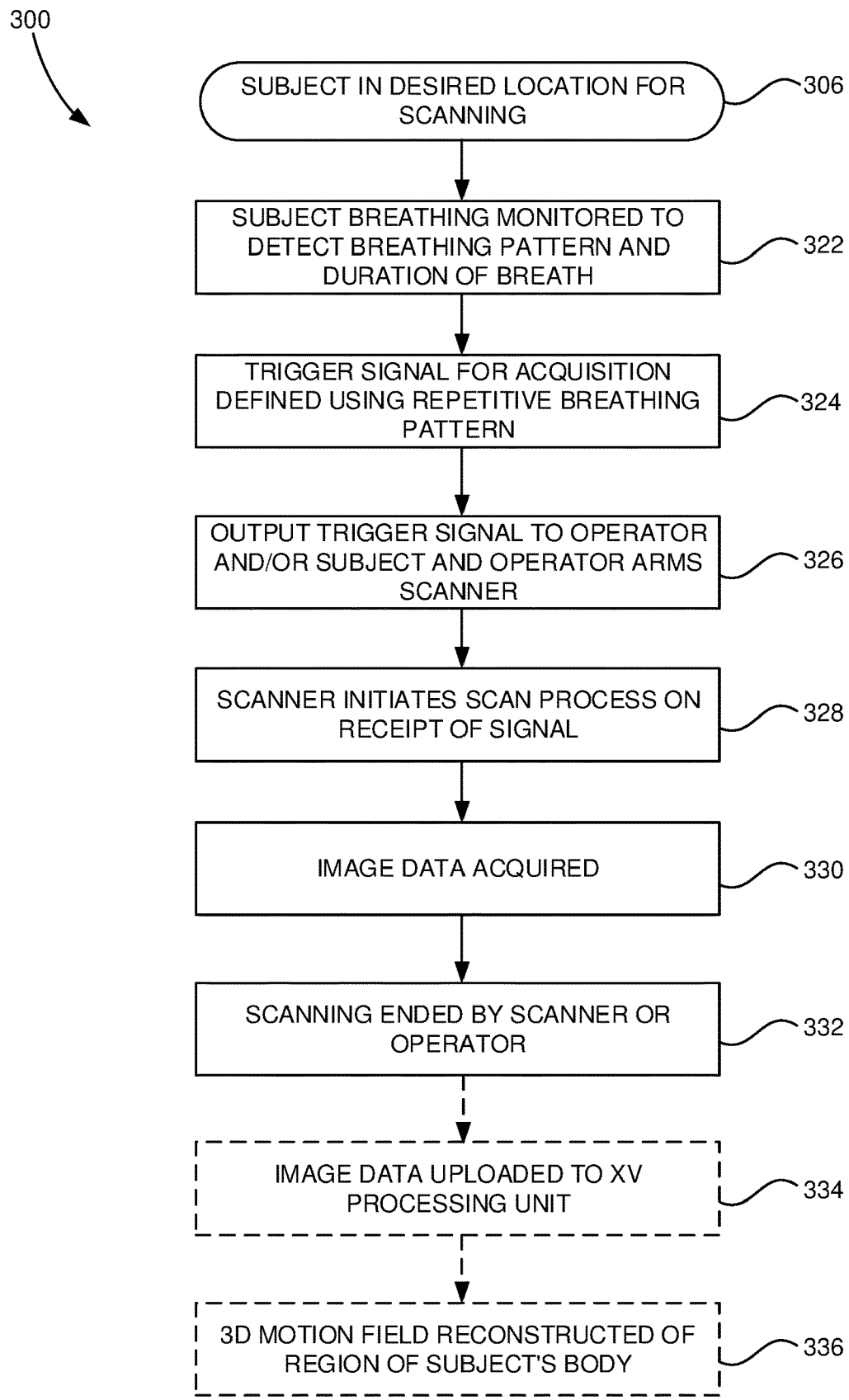
FIG. 11 is a flow chart showing steps in the method of FIG. 8 for defining a trigger signal for acquisition based on the subject's breathing, and also the methods of both of FIGS. 8 and 9 for acquiring the images and uploading image data for XV processing, according to some embodiments of the disclosure.

Referring now to FIG. 11, the method 300 continues upon the subject 200 being in the desired location for commencing scanning. The method 300 may in fact skip each of the preceding steps and begin once the subject 200 is in the desired location for commencing scanning as determined e.g., by an operator or technician. The steps in the flow chart of FIG. 11 may relate to the method 300A of FIG. 8, namely optimising timing of image acquisition based on a physiological parameter of the subject 200. Further steps in the overall method 300 as shown may include acquiring the images and then optionally uploading image data for XV processing, according to some embodiments of the disclosure.

At step 322, the method 300 includes monitoring the subject's breathing using at least one sensor 170, e.g., a flowmeter, as described previously with reference to FIG. 2. An initial step of the method 300 may include connecting the sensor 170 via the connector 190 to the imaging device 100. Alternatively, the second sensor 170 may be integral with the imaging device 100. The method 300 may include positioning the subject sensor 170 near and/or within the subject's mouth for monitoring the subject's breathing. Where the subject sensor 170 is a flowmeter or spirometer, the method 300 may include monitoring air flow changes associated with the subject's breathing. Where the subject sensor 170 is a thermal sensor, the method 300 includes monitoring temperature changes of the air associated with the subject's breathing. Where the subject sensor 170 is a gas sensor, the method 300 includes monitoring gaseous changes in air content associated with the subject's breathing.

At step 324, the trigger signal for acquisition of the images is then defined by an algorithm performed by the processor 150. The data from the subject sensor 170 is preferably received by the control system 152 and processed by the processor 150 to detect a breathing pattern of the subject 200 and/or duration of the subject's breath. The processor 150 is configured to monitor the detected breathing pattern and/or duration of the subject's breath to determine if a repetitive breathing pattern is detected. For example, the subject sensor 170 may be a flowmeter which detects changes in airflow during the subject's breathing. The processor 150 may receive airflow data from the flowmeter over a period of time, for example, 1 minute of the patient breathing in a relaxed state. The processor 150 may process the airflow data using signal processing techniques to determine if a repetitive breathing pattern is detected, which is free from hiccups, sneezing, sniffing, coughing and hyperventilation, in each sequence analysed.

Once a repetitive breathing pattern is detected, the processor 150 may be further configured to analyse the repetitive breathing pattern to identify one or more characteristics of a breathing cycle of the subject 200. For example, peaks and troughs are evident in airflow data which are indicative of the start of inspiration and end of expiration and detectable using known signal processing techniques. Furthermore, the characteristics of breathing cycles are also known to a person skilled in the art, and may be input into the processor algorithm. The processor 150 may then be configured to determine a trigger signal to commence image acquisition at step 324 based on the one or more characteristics of the breathing cycle. The trigger signal defined by the processor 150 may include at least a start time for the scan to commence, which is typically associated with the start of inspiration identified by the data processing. The end of expiration is then estimated as the stop or end time for the scan using the average or typical duration of the breath.

In some embodiments, the processor 150 may be configured to analyse the repetitive breathing pattern to detect the amplitude (e.g., peaks and troughs) of the respiratory signal from the airflow data, in particular from volume vs time data. The processor 150 may then be configured to determine a trigger signal to commence image acquisition at step 324 based on the amplitude of the respiratory signal corresponding to a pre-defined threshold value or range of values. For example, the pre-defined threshold value or range of values may correlate with the subject's peak inspiratory volume (or an associated flow rate) or peak expiratory volume (or an associated flow rate), such as measured by a flowmeter of the imaging device 100. A start time for the scan to commence may thus be defined based on the signal amplitude instead of the phase and/or duration of the subject's breath.

The imaging device 100 and method 300 may acquire images over part of a breath (e.g., only inspiration or expiration phases of the breathing cycle) or over a full breath (i.e., both inspiration and expiration phases of the breathing cycle). In order to ensure that the optimal images are acquired, the processor 150 may be configured to determine start and end points of the acquisition, which may also be based on the frame rate of image acquisition of the scanner 100. For example, the scanner 100 may desirably acquire images using the source(s) 110 and detector(s) 120 at a frame rate of more than 7 frames/second, and preferably more than 10 frames/second, for example at 15 frames/second. The frame rate may be a fixed frame rate, or alternatively, may be triggered based on amplitude of the respiratory signal, for example, a number of points (e.g., 7 points) evenly spaced between the maximum and minimum peak inspiratory or expiratory volumes (or associated flow rate).

For image acquisition over a part or full breath of the subject 200, the start time for acquisition may be shifted, for example, by 1 frame (or a few frames) earlier to ensure that the images acquired include the desired dynamic event. For example, when acquiring a full breath, the image acquisition may be shifted to begin 1 to 2 frames before the start of inspiration (to ensure a full inspiration is captured), and the end of acquisition may be shifted to end 1 to 2 frames after the end of expiration (to ensure a full expiration is captured). This may beneficially account for any time delay in the controller 140 switching on the energy source(s) 110 and detector(s) 120 to acquire the images.

In some embodiments, the processor 150 determines an expected breath length of the subject 200 (e.g., duration of a single breath) for the image acquisition by measuring the time between successive maxima or successive minima in the volume vs time curves from the airflow data, and/or by determining an average volume vs time curve and then measuring the time between successive maxima or successive minima, or through spectral analysis of the volume data. The processor 150 also determines the expected inspiratory time by calculating the length of time between a minimum volume timepoint and maximum volume timepoint, and determines expiratory time by calculating the length of time between a maximum volume timepoint and a minimum volume timepoint.

In some embodiments, the processor 150 then calculates the number of phases and/or frames required, and time between required frames, using the breath length or the inspiratory time. The frame rate may be based on expected breath time which is calculated as Nb/Tb, where Nb is the number of frames desired per breath, and Tb is the measured breath period for the subject 200. Nb may be a number between 5 and 15, optimised to deliver successful CTXV scans without excessive dose. A start time for image acquisition is determined based on the amplitude of the respiratory signal (volume vs time curve) corresponding to the start of inspiration, with image acquisition timed to start just before the start of inspiration (e.g., 1 or 2 frames before the start of inspiration). An end time for image acquisition may be determined based on the expected breath length or the expected inspiratory time. Thus, a trigger signal for image acquisition is determined.

Where the imaging device 100 includes more than one energy source 110 and detector 120 (e.g., four energy sources 110 and detectors 120 as shown in FIGS. 3 to 5), the multiple time series of images are advantageously acquired by the imaging device 100 and method 300 simultaneously or at substantially the same time over part of the breath or over a full breath of the subject 200. Preferably, the time series of images are acquired over a single full breath of the subject 200. Acquiring multiple time series (from different angles) of a single breath, rather than acquiring a single time series (from different angles) of multiple breaths, removes the requirement for the subject 200 to maintain consistent breathing across multiple breaths. The controller 140 operates each energy source 110 and corresponding detector 120 to acquire the images at the same or substantially the same defined start and end points of the trigger signal. Instead of operating the energy sources 110 and corresponding detectors 120 simultaneously, it may be preferable to sequentially acquire the images with a short timing offset for operation of the energy source/detector pairs. This may advantageously reduce x-ray backscatter and thus improve the image quality. The processor 140 may be configured to correct for the timing differences between the time series of images acquired when processing the data.

Notably, the trigger signal to commence image acquisition as per step 324 may be defined based on one or both of the first and second inventive aspects, that is, the trigger signal to commence image acquisition may be based on the subject 200 being in the desired location for scanning (detected position and/or orientation of the subject's body) and/or detection of a repetitive breathing pattern (monitored physiological parameter). Alternatively, the trigger signal to commence image acquisition may only be based on one of the first or second inventive aspects.

Furthermore, an additional output for defining the trigger signal may include movement of the subject 200. In particular, the timing of the image acquisition may be based on no detected movement of the subject 200 or some detected movement which indicates that the subject 200 is in a relatively stationary position (e.g., compared to a threshold). Preferably, in embodiments for dynamic lung imaging, the movement detected and monitored is non-breathing related movement of the subject's body 210 between the energy source(s) 110 and detector(s) 120. Any breathing-related movements, such as due to diaphragm expansion and contraction during expiration and inspiration, respectively, is preferably excluded from the analysis. Ideally, the subject's breathing is not restricted or controlled during image acquisition. Advantageously, the imaging device 100 may be configured to acquire the images while the subject 200 is breathing and preferably of a single breath.

This output may be achieved through use of movement data of the subject 200 monitored using at least one sensor. The sensor may include one or more of a motion sensor (e.g., camera 160), a resistive sensor, a weight sensor (e.g., sensor 178), a force sensor, and a pressure sensor. The motion sensor may include an accelerometer, gyroscope and/or magnetometer for measuring motion of the subject's body 210. The resistive sensor may include a strain gauge, for example, which may measure displacement of the subject's body 210. In some embodiments, the motion sensor includes the camera 160, which may be used to monitor non-breathing related movement, as well as determining if the subject 200 is in the desired location for scanning.

The sensor data may be processed by the processor 150 to monitor movement of the subject's body 210 located between the energy source(s) 110 and detector(s) 120. The movement is preferably non-related breathing movement of the subject's body. For example, a number of sensor readings may be taken over a period of time providing multiple data points on the changes in motion, resistance, weight, pressure or force of the subject's body 200 in the scanner 100. The motion changes may be monitored by the camera 160 and/or weight sensor 178, for example. If a change in motion, resistance, weight, pressure or force is detected by the processor 150, the output may include that movement of the patient 200 is detected and that scanning should not commence. In this instance, instructions may be outputted to subject 200 and/or operator via the output device 117 to instruct the subject 200 to remain still and continue breathing normally for image acquisition to commence. The processor 150 may then continue monitoring the subject's movement until consecutive comparisons on the sensor readings reveal no movement or only limited movement based on a threshold requirement.

The movement of the subject 200 may be determined through detecting changes in the subject's weight through a weight sensor 178 located in the support member for supporting the subject's body 210 (e.g., the seat 124 or platform of the imaging device 100). The processor 150 may receive sensor data from the weight sensor 178 over a period of time to determine if there is any movement from the subject 200 or only limited movement based on a threshold requirement. Fluctuations in weight detected may be indicative of movement of the subject 200 and used by the processor 150 to determine the timing of image acquisition and generation of the trigger signal at step 324.

Once the trigger signal is defined, step 326 of the method 300 is to output the trigger signal via the output device 117 to the operator and/or subject 200. Based on the trigger signal and data outputs from the processor 150, the operator will then determine that the scan can commence and will arm the scanner 100 for scanning. This will place the scanner 100 in a stand-by mode such that it is ready to initiate scanning of the subject's body 210. At step 328, the scanner 100 initiates the scan process on receipt of a signal received as an input from the operator. On the defined trigger start time, the scan begins and continues for the duration of the patient's breath, as determined during the monitoring stage or controlled by the operator. The imaging device 100 is also configured to provide audible and/or visual alerts of the scanning progress and duration to the operator and/or subject 200 via the output device 117. At the end of the scanning process, the imaging device 100 performs scan quality checks and outputs the image data acquired at step 330. The data may be outputted for the operator to review and perform a quality check.

In other embodiments, the method 300 may exclude the step 326 and the scanner may automatically proceed with scanning the subject 200 once the trigger signal is defined and the requirements met. Optionally, the patient's breathing may be monitoring during image acquisition using the flowmeter of the imaging device 100. The processor 150 may process the airflow data to determine an end time for image acquisition based on the amplitude of the respiratory signal (volume vs time curve) corresponding to the end of expiration. At step 332, the operator may manually stop the scanning once all the necessary images have been acquired or the scanning may be automatically ended by the scanner 100.

Once the scan has finished, the image data may be uploaded to the XV processing unit 186 at step 334, which is located either on-board the imaging device 100 or accessed via a cloud-based server and XV processing application. This step may be initiated upon action taken by the operator or the processor 150 may be configured to automatically upload the image data once the scanning is complete. The final step 336 in the method 300 is for a three-dimensional motion field to be reconstructed by the processor 150 or off-board XV processing application of the region 230 of the subject's body 200 that was imaged, such as by using XV techniques described in previously mentioned International Patent Publication Nos. WO 2011/032210 A1 and WO 2015/157799 A1 and incorporated herein by reference.

Embodiments of the disclosure advantageously provide an imaging device 100 and method 300 of imaging that may acquire images suitable for use with XV technology, and that may reduce the use of X-rays in the scanning process, providing the ability to more frequently scan patients including young children due to the reduced burden of radiation. Embodiments of the inventive device 100 and method 300 of imaging may reduce the radiation dosage as fewer separate images need to be taken and a shorter scanning duration is required as the scanning may be performed of a single breath of the patient. This advantageously allows for use of embodiments of the imaging device 100 and method 300 of imaging by younger patients, such as older than three years, by reducing the radiation dosage, shortening the scanning time, and removing the requirement for the patient to hold their breath. Embodiments of the inventive imaging device 100 and method 300 of imaging may also encourage use across many patient groups including those patients unable to be readily scanned, such as young children and mobility-impaired patients, by providing a walk-in scanner which may allow for scanning of the patient in a seated or upright standing position.

It is to be understood that various modifications, additions and/or alternatives may be made to the parts previously described without departing from the ambit of the present disclosure as defined in the claims appended hereto.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components or group thereof.

EXAMPLE

An example illustrating an application of some embodiments of the disclosure will now be described. The example is supplied to provide context and explain features and advantages of embodiments of the disclosure and is not limiting on the scope of the disclosure as defined in the claims.

A method of using an imaging device to acquire a time series of in vivo images of a region 230 of a patient's body 210 over a single breath of the patient 200 will be described with reference to the imaging device 100 of FIGS. 1 to 7.

The patient 200 enters the imaging device 100 between the source unit 112 and detector unit 122 and sits on the seat or chair 124 facing the source unit 112. The position and/or orientation of the patient's body 210 between the energy source(s) 110 and detector(s) 120 is detected using a camera 160, preferably a video camera system with depth information. The video camera system with depth information (e.g., combined video camera with LIDAR, Microsoft Kinect type system, stereo camera setup, etc.) allows visualisation of the position and/or orientation of the patient 200, as well as the motion of the patient 200 and/or breath detection. The motion-based system 154 uses image data from the camera 160 and processes the data to locate and measure key patient reference points in order to detect the position and/or orientation of the patient's body 210.

A processor 150 determines an adjustment of the detected position and/or orientation of the patient's body 210 to a desired location for acquiring images of the region 230 to be scanned. The adjustment is determined also based on an estimated position of the region 230 to be imaged using either historical collated data (e.g., a model of the lung position within the body based on other lung scans), or using prior-acquired data of the patient 200 (such as previous scan data or physical characteristics/attributes of the patient 200).

The processor 150 also determines if the patient 200 is not sitting up straight and their body is tilted to the side or forwards/backwards. This is achieved by assessing data from the camera 160. If the patient 200 is outside of the desired location for image acquisition, patient positioning directions are provided to the patient 200 to perform the adjustment and move to the desired location for scanning. The instructions are provided via a display 118 and/or speaker 119 via a communication system 188. If the region 230 of the patient's body 210 to be scanned is not in the field of view, an operator manually adjusts the seat 124 to the desired location for scanning, or this occurs automatically by a controller 140 of the imaging device 100 operating an actuator of the seat 124.

A position check is optionally performed by a low-dose preliminary scan of the patient 200 using x-ray images acquired from a single projection via one source/detector pair. The processor 150 is configured to process the image data and identify the region 230 to be imaged, and determine an adjustment of the subject's body 210 to a desired location if required. Again, the patient 200 is instructed to move to the desired location and/or the seat 124 is manually or automatically moved to the desired location (if required). In addition, once the patient 200 is in the correct position, the magnification of the energy sources 110/detectors 120 is optionally adjusted to ensure that the lungs are correctly positioned in the field of view (FOV) of each of the detectors 120. This is achieved by moving the patient 200 either towards the detectors 120 (i.e., to reduce magnification) or further away from the detectors 120 (i.e., to increase the magnification). The patient 200 can be moved using the seat 124 (e.g., manually by an imaging technician or operator, or automatically by the imaging device 100) or moving the patient's body 210 (e.g., by the operator or imaging device 100 providing instructions to the patient 200, or the operator moving the patient's body 210).

The patient 200 is then optionally provided with instructions about breathing before the scan begins. The instructions are provided by the operator or automatically on the display 118 and/or speaker 119 via the communication system 188. The patient 200 is instructed to relax and breathe normally. The patient's breathing is then monitored using a flowmeter of the imaging device 100. The flowmeter measures airflow during the patient's breathing. The processor 150 receives airflow data from the flowmeter over a period of time, for example, 1 minute of the patient breathing in a relaxed state. The processor 150 processes the airflow data to determine volume vs time, and if a sufficiently repetitive breathing pattern is detected, which is free from artifacts (e.g., hiccups, sneezing, sniffing, coughing and hyperventilation) in each sequence analysed. Once a repetitive breathing pattern is detected, the processor 150 analyses the pattern to identify one or more characteristics of a breathing cycle of the subject 200.

The processor 150 determines an expected breath length of the patient 200 for the image acquisition by measuring the time between successive maxima or successive minima in the volume vs time curves, and/or by determining an average volume vs time curve and then measuring the time between successive maxima or successive minima, or through spectral analysis of the volume data. The processor 150 also determines the expected inspiratory time by calculating the length of time between a minimum volume timepoint and maximum volume timepoint, and determines expiratory time by calculating the length of time between a maximum volume timepoint and a minimum volume timepoint.

The processor 150 then calculates the number of phases and/or frames required, and time between required frames, using the breath length or the inspiratory time. The frame rate based on expected breath time is calculated as Nb/Tb, where Nb is the number of frames desired per breath, and Tb is the measured breath period for the patient. Nb will be a number between 5 and 15, optimised to deliver successful CTXV scans without excessive dose. A start time for image acquisition is determined based on the amplitude of the respiratory signal (volume vs time curve) corresponding to the start of inspiration, with image acquisition timed to start just before the start of inspiration (e.g., 1 or 2 frames before the start of inspiration). An end time for image acquisition may be determined based on the expected breath length or the expected inspiratory time. Thus, a trigger signal for image acquisition is determined.

The trigger signal is optionally also determined based on the patient 200 being in a substantially stationary position in the scanner 100. Non-breathing related movement of the patient's body 210 is monitored through data acquired using the camera 160, which is preferably a video camera system with depth information. Sensor data from the camera 160 is processed by the processor 150 to monitor movement of the patient's body 210 in the scanner 100. A number of sensor readings are acquired over a period of time providing multiple data points on the changes in motion of the subject's body in the scanner 100. If a change in motion is detected by the processor 150, the scanner 100 outputs to the patient 200 and/or operator via the display 118 and/or speaker 119 that movement has been detected and that the scanning should not commence. Instructions may optionally be outputted to subject 200 and/or operator via the display 118 and/or speaker 119 to instruct the subject 200 to remain still and continue breathing normally for image acquisition to commence. The processor 150 then continues to monitor the subject's movement until consecutive comparisons on the sensor readings reveal no movement or only limited movement based on a threshold requirement. The trigger signal to commence image acquisition may include at least a start time if the patient 200 is in a substantially stationary position.

Imaging of the region 230 is then performed by the operator arming the scanner 100 and initiating the scan process, or the processor 150 automatically actioning the imaging. Optionally, the patient's breathing may be monitoring during image acquisition using the flowmeter of the imaging device 100. The processor 150 may process the airflow data to determine an end time for image acquisition based on the amplitude of the respiratory signal (volume vs time curve) corresponding to the end of expiration. The scanning is then ended either automatically by the scanner 100 or manually by the operator. A time series of in vivo images of the region 230 of the patient's body 210 is thus acquired over a single breath of the patient 200. The patient 200 then exits the imaging device 100.

The image data is optionally uploaded to a computer (e.g., a processor 150 on the scanner 100 or remote computing device), and then subsequently uploaded to the cloud for XV processing via an XV processing unit 186 located off-board the scanner 100. Finally, the XV processing unit 186 optionally reconstructs a three-dimensional motion field of the region 230 of the patient's body 210.

It is to be understood that the following claims are provided by way of example only, and are not intended to limit the scope of what may be claimed in any future application. Features may be added to or omitted from the claims at a later date so as to further define or re-define the disclosure.

The invention claimed is:

1. An imaging device for acquiring a time series of in vivo images of at least part of a subject's lung, the imaging device comprising:
   at least three energy sources;
   at least three detectors for detecting energy from the at least three energy sources passing through the part of the subject's lung located between the energy sources and detectors;

a controller configured to operate the at least three energy sources and the at least three detectors to acquire three time series of in vivo images of the part of the subject's lung;

at least one sensor for monitoring a physiological parameter associated with the part of the subject's lung to be imaged;

at least one processor configured to determine timing of the image acquisition based at least on the monitored physiological parameter; and at least one sensor for monitoring movement of the subject's lung located between the at least three energy sources and at least three detectors;

determine timing of the image acquisition based also on the monitored movement of the subject's lung;

process data from the at least one sensor for monitoring movement to detect movement of the subject's lung located between the at least three energy sources and at least three detectors;

monitor the detected movement to determine if the subject is in a stationary position;

determine a trigger signal to commence image acquisition including at least a start time if the subject is in the stationary position; and reconstruct a three-dimensional lung motion field based on the three time series of images acquired.

2. The imaging device according to claim 1, wherein the at least one sensor for monitoring the physiological parameter is configured to detect a physiological parameter associated with the subject's breathing.

3. The imaging device according to claim 2, wherein the processor is further configured to:

analyse the data from the at least one sensor for monitoring the physiological parameter to detect a breathing pattern of the subject and/or duration of the subject's breath; and monitor the detected breathing pattern and/or duration of the subject's breath to determine if a repetitive breathing pattern is detected.

4. The imaging device according to claim 3, wherein if the repetitive breathing pattern is detected, the processor is further configured to:

analyse the repetitive breathing pattern to identify one or more characteristics of a breathing cycle of the subject; and determine the trigger signal to commence image acquisition including at least the start time and/or end time based on the one or more identified characteristics of the breathing cycle.

5. The imaging device according to claim 1, wherein the at least one sensor for monitoring the physiological parameter is positionable near and/or within the subject's mouth, and comprises one or more of:

a flowmeter for monitoring air flow changes near and/or within the subject's mouth;

a thermal sensor for monitoring temperature changes of the air near and/or within the subject's mouth; and a gas sensor for monitoring gaseous changes in the air content near and/or within the subject's mouth.

6. The imaging device according to claim 1, further comprising at least one sensor for detecting position and/or orientation of the subject's lung located between the at least three energy sources and the at least three detectors, wherein the processor is further configured to:

determine timing of the image acquisition based also on the detected position and/or orientation of the subject's lung.

7. The imaging device according to claim 6, wherein the processor is further configured to:

determine an adjustment of the position and/or orientation of the subject's lung to a desired location between the at least three energy sources and the at least three detectors for acquiring the images of the part of the subject's lung.

8. The imaging device according to claim 7, wherein the processor is further configured to:

estimate a position of the part of the subject's lung to be imaged using prior-acquired data; and determine the desired location for acquiring the images based on the estimated position.

9. The imaging device according to claim 7, further comprising:

a support member for supporting the subject's lung at a location between the at least three energy sources and the at least three detectors; and an actuator operable for adjusting the position and/or orientation of the support member.

10. The imaging device according to claim 9, wherein the controller is further configured to:

control the actuator to adjust the position and/or orientation of the support member to support the subject's lung at the desired location for acquiring the images.

11. The imaging device according to claim 10, further comprising an output device, and wherein the processor is further configured to:

output instructions, using the output device, for an operator and/or the subject to adjust the subject's position and/or orientation to the desired location for acquiring the images.

12. The imaging device according to claim 6, wherein the at least one sensor for detecting position and/or orientation comprising one or more of: a camera, a light sensor, a motion-based sensor, and a laser sensor.

13. The imaging device according to claim 1, comprising at least three energy sources and at least three detectors for acquiring three time series of in vivo images of the region of the subject's body, and wherein the processor is further configured to:

reconstruct a three-dimensional motion field based on the three time series of images acquired.

14. A method for acquiring a time series of in vivo images of at least part of a subject's lung, the method comprising the steps of:

providing an imaging device comprising:
at least three energy sources;
at least three detectors for detecting energy from the at least three energy sources passing through the part of the subject's lung located between the at least three energy sources and at least three detectors; and
a controller configured to operate the at least three energy sources and the at least three detectors to acquire three time series of in vivo images of the part of the subject's lung;

monitoring, using at least one sensor, a physiological parameter associated with the part of the subject's lung to be imaged;

determining, using at least one processor, timing of the image acquisition based at least on the monitored physiological parameter; and operating the controller to acquire the time series of in vivo images of the part of the subject's lung monitoring, using at least one sensor, movement of the subject's body located between the at least three energy sources and the at least three detectors; and wherein the method further includes the step of the processor:

determining timing of the image acquisition based also on the monitored movement of the subject's body;

processing data from the at least one sensor for monitoring movement to detect movement of the subject's body located between the at least three energy sources and the at least three detectors;

monitoring the detected movement to determine if the subject is in a stationary position;

determining a trigger signal to commence image acquisition including at least a start time if the subject is in the stationary position; and reconstructing a three-dimensional lung motion field based on the three time series of images acquired.

15. The method according to claim 14, further comprising the step of:

detecting, using the at least one sensor for monitoring the physiological parameter, a physiological parameter associated with the subject's breathing.

16. The method according to claim 15, further comprising the steps of the processor:

analysing the data from the at least one sensor for monitoring the physiological parameter to detect a breathing pattern of the subject and/or duration of the subject's breath; and monitoring the detected breathing pattern and/or duration of the subject's breath to determine if a repetitive breathing pattern is detected.

17. The method according to claim 16, wherein if the repetitive breathing pattern is detected, the method further comprises the steps of the processor:

analysing the repetitive breathing pattern to identify one or more characteristics of a breathing cycle of the subject; and determining the trigger signal to commence image acquisition including at least the start time and/or end time based on the one or more identified characteristics of the breathing cycle.

18. The imaging device according to claim 1, wherein the part to be imaged includes the entire lung of the subject.

19. The imaging device according to claim 1, wherein the controller is configured to acquire the three time series of in vivo images of the part of the subject's lung while the at least three energy sources and the at least three detectors remain stationary.

20. The method according claim 14, wherein the part to be imaged includes the entire lung of the subject.

21. The method according to claim 14, comprising configuring the controller to acquire the three time series of in vivo images of the part of the subject's lung while the at least three energy sources and the at least three detectors remain stationary.

* * * * *